(12) United States Patent
Yokota et al.

(10) Patent No.: US 10,781,045 B2
(45) Date of Patent: Sep. 22, 2020

(54) BOX MOVING DEVICE

(71) Applicant: ISHIDA CO., LTD., Kyoto-shi, Kyoto (JP)

(72) Inventors: Yuji Yokota, Ritto (JP); Yoshinobu Shimomae, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/487,092

(22) PCT Filed: Dec. 11, 2017

(86) PCT No.: PCT/JP2017/044342
§ 371 (c)(1),
(2) Date: Aug. 20, 2019

(87) PCT Pub. No.: WO2018/168117
PCT Pub. Date: Sep. 20, 2018

(65) Prior Publication Data
US 2019/0367279 A1    Dec. 5, 2019

(30) Foreign Application Priority Data

Mar. 15, 2017 (JP) ................................ 2017-050519

(51) Int. Cl.
*B65G 15/14* (2006.01)
*B65B 5/08* (2006.01)
(Continued)

(52) U.S. Cl.
CPC ................ *B65G 15/14* (2013.01); *B65B 5/08* (2013.01); *B65B 43/52* (2013.01); *B65B 43/54* (2013.01);
(Continued)

(58) Field of Classification Search
CPC ......... B65G 15/14; B65G 17/28; B65G 21/14
(Continued)

(56) References Cited

U.S. PATENT DOCUMENTS 2,919,013 A * 12/1959 Culpepper ............. B65G 21/14
198/812
3,140,971 A * 7/1964 Crescenzo ........ B29C 66/00441
156/498
(Continued)

FOREIGN PATENT DOCUMENTS

JP    38-26291 U    12/1963
JP    47-26768 U    11/1972
(Continued)

OTHER PUBLICATIONS

The Search Report from the corresponding International Patent Application No. PCT/JP2017/044342 dated Feb. 27, 2018.
(Continued)

*Primary Examiner* — Joseph A Dillon, Jr.
(74) *Attorney, Agent, or Firm* — Shinjyu Global IP

(57) ABSTRACT

A box moving device is disclosed. The box moving device changes the position of a box having four side surfaces. The box moving device is equipped with a conveyor and a movement control unit. The movement control unit drives the conveyor to cause the box to move from a first position to a second position. The conveyor can alternately switch between a first state, in which it is contracted along a moving direction of the box, and a second state, in which it is extended along the moving direction of the box. The movement control unit causes the box to move from the first position to the second position by driving the conveyor that is in a holding mode in which it holds at least one of the side surfaces of the box and simultaneously switching the conveyor from the first state to the second state.

8 Claims, 17 Drawing Sheets

(51) Int. Cl.
*B65B 43/52* (2006.01)
*B65B 43/54* (2006.01)
*B65G 17/26* (2006.01)
*B65G 17/48* (2006.01)
*B65G 21/14* (2006.01)

(52) U.S. Cl.
CPC ............. *B65G 17/26* (2013.01); *B65G 17/48* (2013.01); *B65G 21/14* (2013.01); *B65G 2201/025* (2013.01); *B65G 2203/0225* (2013.01); *B65G 2812/02227* (2013.01)

(58) Field of Classification Search
USPC ...... 198/604, 605, 620, 626.1, 626.2, 626.3, 198/626.4, 626.5, 626.6, 812, 817
See application file for complete search history.

(56) References Cited

U.S. PATENT DOCUMENTS

| | | | | |
|---|---|---|---|---|
| 3,312,330 | A * | 4/1967 | Juengel | B65G 15/105 198/369.2 |
| 4,694,953 | A * | 9/1987 | Murphy | B65G 15/14 198/626.5 |
| 4,924,658 | A * | 5/1990 | Takehama | B65B 11/54 53/206 |
| 5,074,402 | A * | 12/1991 | Bender-Zanoni | B65G 15/10 198/626.1 |
| 5,271,210 | A * | 12/1993 | Tolson | B65B 61/28 198/343.1 |
| 5,277,297 | A * | 1/1994 | Tolson | B65G 21/14 198/594 |
| 5,385,004 | A * | 1/1995 | Tolson | B65G 15/14 198/626.1 |
| RE35,243 | E * | 5/1996 | Tolson | B65G 15/14 198/343.1 |
| 6,161,678 | A * | 12/2000 | Cassoli | B65B 59/02 198/626.6 |
| 6,247,581 | B1 * | 6/2001 | Oswald | B65G 21/10 198/812 |
| 6,354,430 | B1 * | 3/2002 | Oe | B65G 15/105 198/465.3 |
| 8,851,275 | B2 * | 10/2014 | Tsai | B65H 31/3009 198/369.7 |
| 8,857,605 | B2 * | 10/2014 | Valli | B65G 19/02 198/817 |

FOREIGN PATENT DOCUMENTS

| | | |
|---|---|---|
| JP | 49-015151 A | 2/1974 |
| JP | 61-151911 U | 9/1986 |
| JP | 2004-155428 A | 6/2004 |

OTHER PUBLICATIONS

The Preliminary Report on Patentability (with Written Opinion) from the corresponding International Patent Application No. PCT/JP2017/044342 dated Sep. 17, 2019.

* cited by examiner

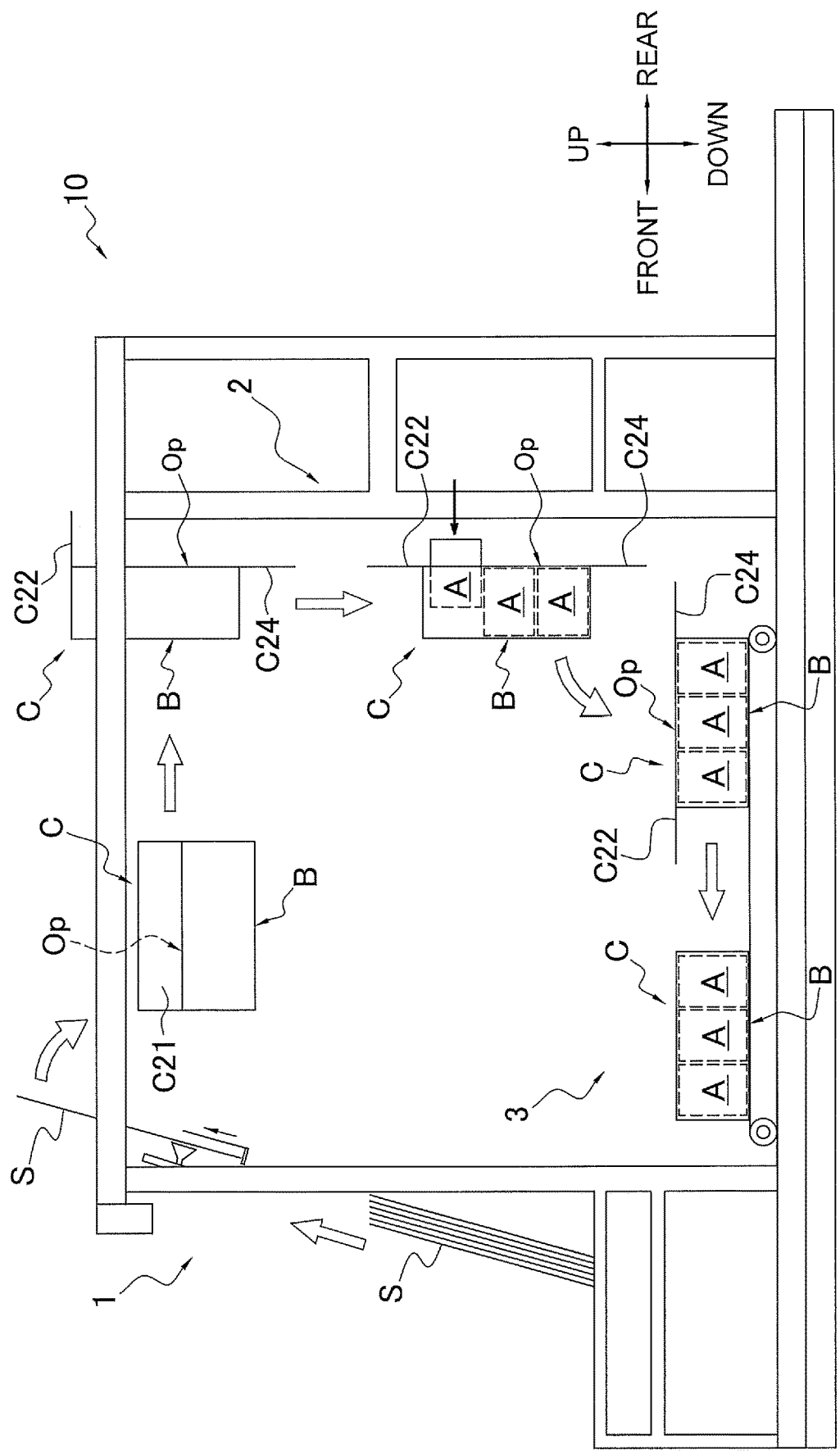
F I G. 1

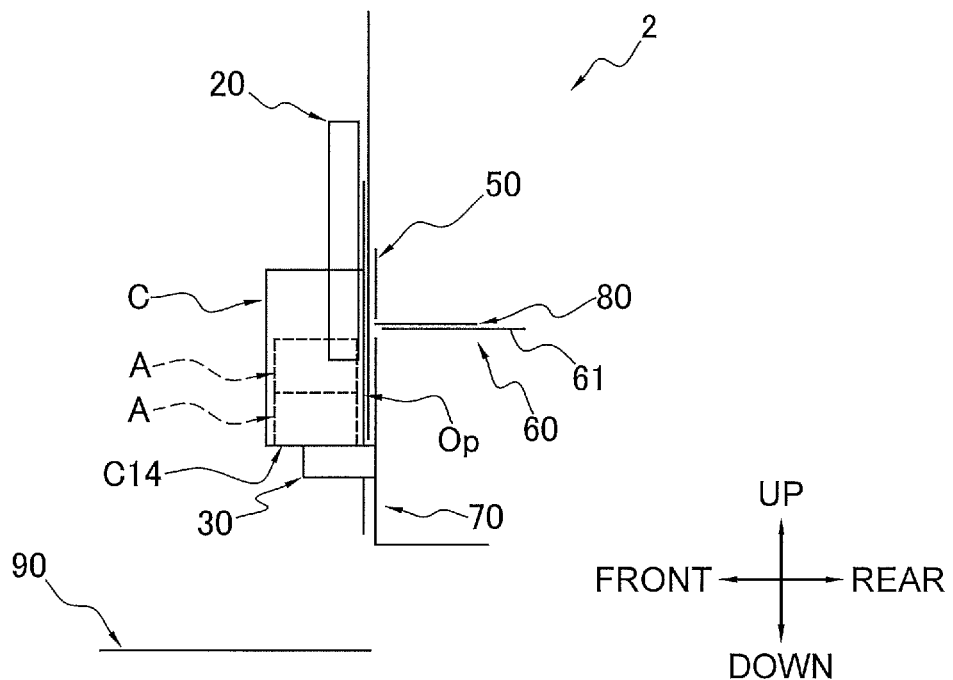
F I G. 3D
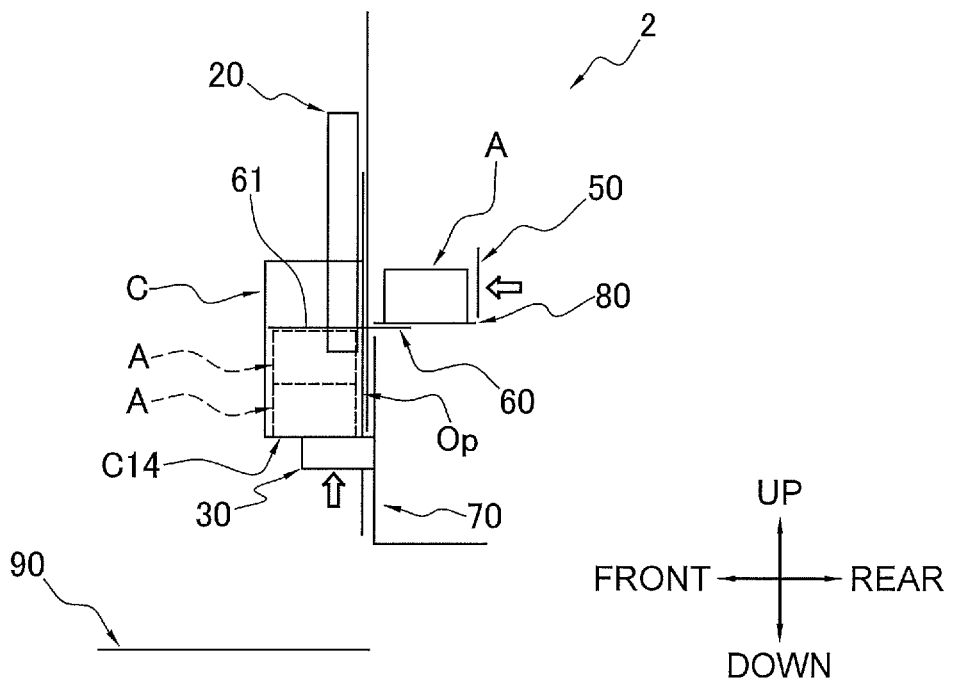
F I G. 3E

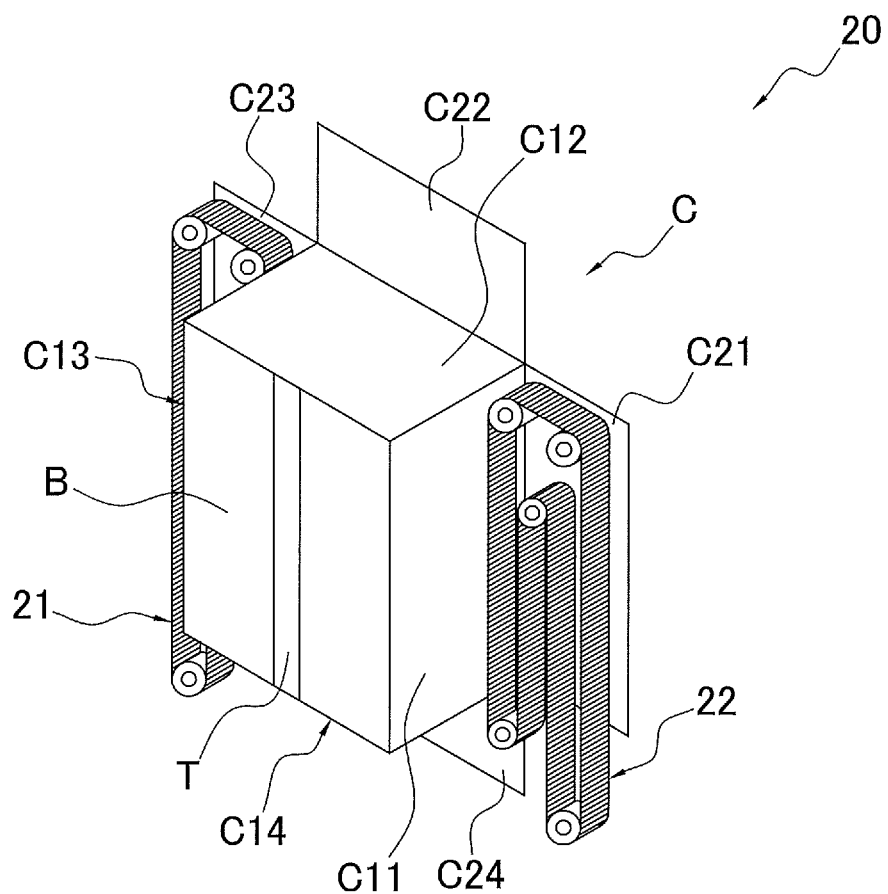
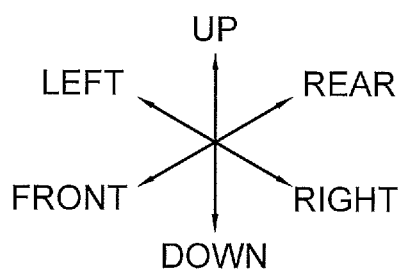
F I G. 4

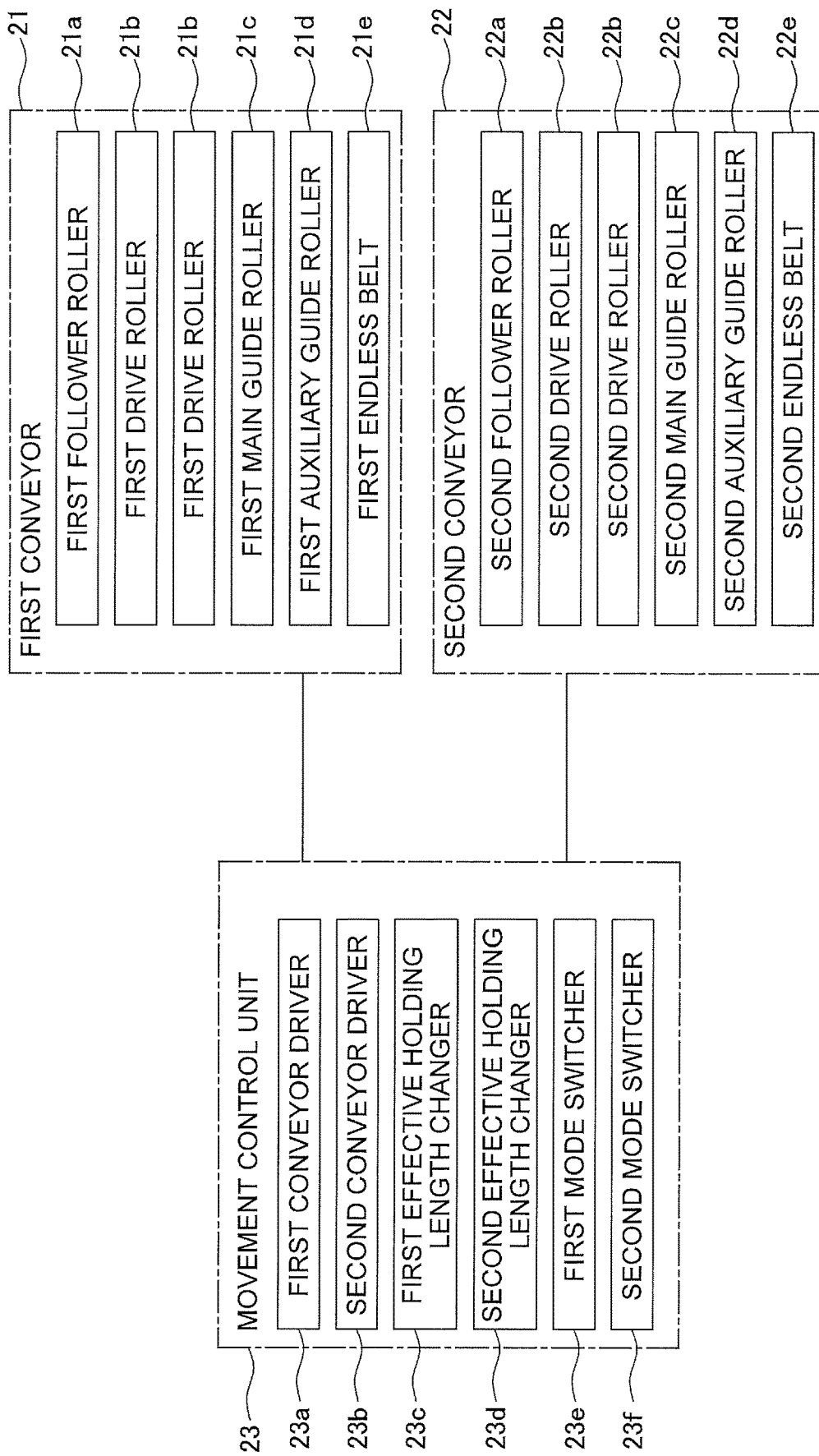
F I G. 8

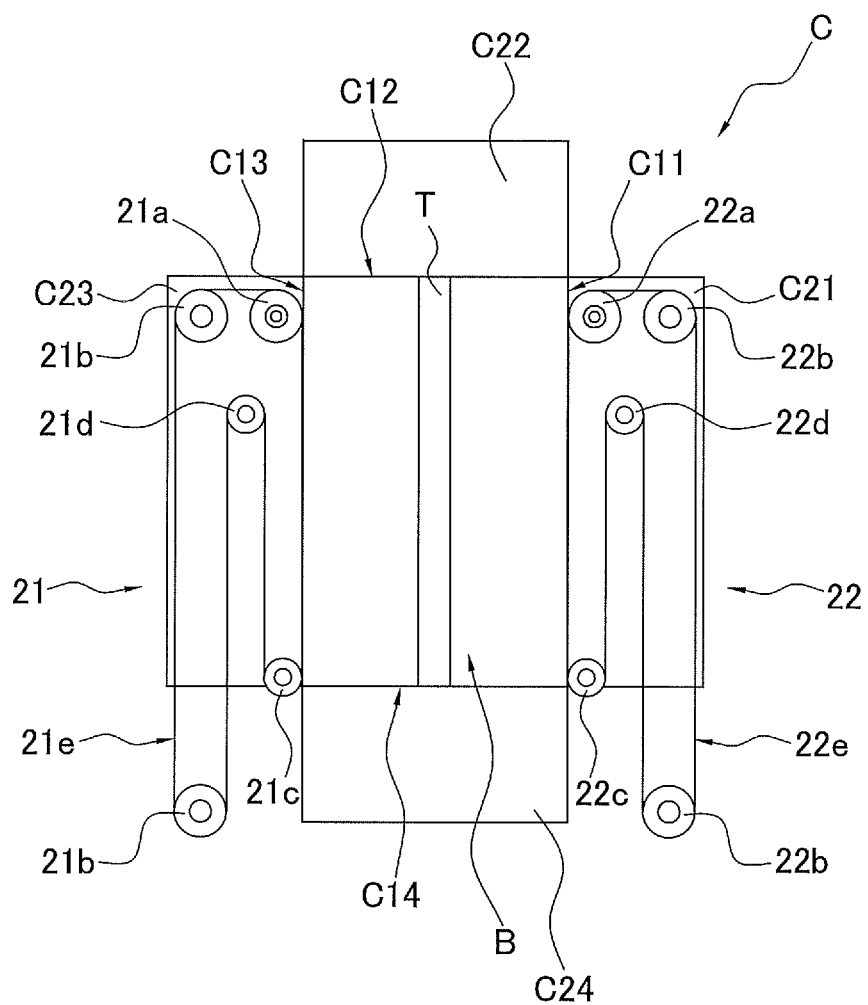
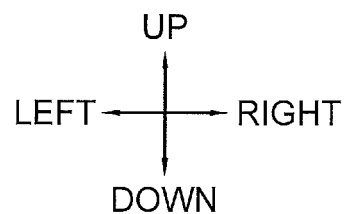
F I G. 10

BOX MOVING DEVICE

CROSS REFERENCE TO RELATED APPLICATIONS

This is the National Phase in the United States of PCT/JP2017/044342, filed Dec. 11, 2017, which claims priority to Japanese Patent Application No. 2017-050519, filed Mar. 15, 2017. Both of those applications are incorporated by reference herein in their entireties.

TECHNICAL FIELD

The present invention relates to a box moving device for changing the position of a box having four side surfaces that are connected to each other in a loop.

BACKGROUND ART

Conventionally, as disclosed in JP-A No. 2004-155428, a box packing apparatus for packing articles into boxes that are in a state in which their openings face the horizontal direction has been known. The box packing apparatus is equipped with a box moving device for moving, to the position at which the articles are packed, the boxes that have been conveyed thereto in the horizontal direction in a state in which their openings face the horizontal direction. The box moving device moves, to the position at which the articles are packed, the boxes by causing the boxes to drop to a predetermined position along the vertical direction, for example. In this case, the box moving device has a stopper for catching the boxes that have dropped to the predetermined position and stopping the movement of the boxes resulting from the drop.

BRIEF SUMMARY

However, in the box moving device that causes the boxes to drop along the vertical direction, in a case where the weight of the boxes is small, there is the concern that the boxes will stop midway before touching the stopper. Furthermore, in a case where the boxes are caused to drop while cover portions of the boxes move along a guide, there is the concern that the boxes will stop midway before touching the stopper because of the force that the guide receives from the cover portions. For that reason, the problem that the boxes do not reach the position at which the articles are packed, so that the articles cannot be packed normally into the boxes, has the potential to occur.

It is an object of the present invention to provide a highly reliable box moving device that moves a box to a predetermined position and inhibits the occurrence of the problem that the box does not reach the predetermined position.

A box moving device pertaining to the invention is a device for changing the position of a box having four side surfaces that are connected to each other in a loop. The box moving device is equipped with a conveyor and a movement control unit. The conveyor has at least a holding mode in which it holds at least one of the side surfaces of the box. The movement control unit drives the conveyor to cause the box to move along a moving direction from a first position to a second position. The conveyor can alternately switch between a first state, in which it is contracted along the moving direction, and a second state, in which it is extended along the moving direction. The movement control unit causes the box to move from the first position to the second position by driving the conveyor that is in the holding mode and simultaneously switching the conveyor from the first state to the second state.

The box moving device pertaining to the invention moves the box to the predetermined position by extending the conveyor in the direction in which it moves the box in a state in which the side surface of the box is being held by the conveyor. Because the box moving device uses the conveyor that can extend and contract in the moving direction of the box, the problem that the box is not conveyed normally to the predetermined position is inhibited. Consequently, with the box moving device pertaining to the invention, reliability can be improved.

Furthermore, in the box moving device pertaining to the invention, it is preferred that the movement control unit switch the conveyor from the first state to the second state by causing an end portion of the conveyor to move from the first position to the second position and switch the conveyor from the second state to the first state by causing the end portion of the conveyor to move from the second position to the first position.

In this case, the box moving device can cause the end portion of the conveyor on the side of the moving destination of the box to extend and contract toward the moving destination of the box. For that reason, the dimension of the conveyor in the moving direction of the box is kept down and a mechanism that moves the conveyor itself along the moving direction of the box becomes unnecessary. Consequently, with this box moving device, space for installing a device other than the conveyor can be ensured in the neighborhood of the box that has been conveyed by the conveyor.

Furthermore, in the box moving device pertaining to the invention, it is preferred that the conveyor further have a non-holding mode in which it does not hold the side surface. In this case, the movement control unit causes the box to move from the first position to the second position, then changes the conveyor from the holding mode to the non-holding mode, and then switches the conveyor from the second state to the first state.

In this case, the box moving device extends the conveyor to move the box to the predetermined position and then contracts the conveyor in the moving direction of the box in a state in which the side surface of the box is not being held by the conveyor. Consequently, this box moving device can prevent the box from being moved by the conveyor when the box moving device contracts the conveyor after having moved the box.

Furthermore, in the box moving device pertaining to the invention, it is preferred that the movement control unit cause the box to move from the first position to the second position by causing the box to move from above to below along the vertical direction in a state in which one of the four side surfaces of the box faces downward.

In this case, the box moving device can move the box to the predetermined position in a state in which the opening of the box faces sideways. Consequently, this box moving device can be utilized in, for example, a box packing apparatus for packing articles into boxes that have been conveyed by a conveyor.

Furthermore, it is preferred that the box moving device pertaining to the invention be further equipped with a flap guide. In this case, the box further has a flap that is a flat panel-shaped cover portion that extends from the side surface. The flap guide guides the flap while the movement control unit is causing the box to move from the first position to the second position.

In this case, the box moving device is equipped with the flap guide for regulating the position of the moving box by guiding the flap of the box. Consequently, this box moving device can prevent positional misalignment of the box that has been conveyed by the conveyor.

Furthermore, in the box moving device pertaining to the invention, it is preferred that in the holding mode the conveyor hold the two side surfaces that are along the moving direction.

In this case, the box moving device can stably move the box to the predetermined position by moving the box while holding, with the conveyor, the side surfaces on both sides of the box.

Furthermore, in the box moving device pertaining to the invention, it is preferred that the conveyor be a telescopic conveyor whose holding surface that holds the side surface can extend and contract in the moving direction.

In this case, because the box moving device uses the telescopic conveyor, the dimension of the conveyor in the moving direction of the box is kept down and a mechanism that moves the conveyor itself along the moving direction of the box becomes unnecessary. Consequently, with this box moving device, space for installing a device other than the conveyor can be ensured in the neighborhood of the box that has been conveyed by the conveyor.

The box moving device pertaining to the invention inhibits the occurrence of the problem that the box does not reach the predetermined position, so an improvement in reliability can be expected.

BRIEF DESCRIPTION OF DRAWINGS

FIG. 1 is a schematic front view of a box packing apparatus 10 that uses a box moving device 20 pertaining to an embodiment of the invention.

FIG. 3D shows a state just after the second article A has been fed into the cardboard box C.

FIG. 3E shows a state just before a third article A is fed into the cardboard box C.

FIG. 4 is a schematic perspective view of the box moving device 20 and shows a state before conveyors 21, 22 move the cardboard box C downward.

FIG. 8 is a block configuration diagram of the box moving device 20.

FIG. 10 is a drawing for describing the operation of the box moving device 20 and shows a state at time t2 in FIG. 13.

DETAILED DESCRIPTION

Figure 2:
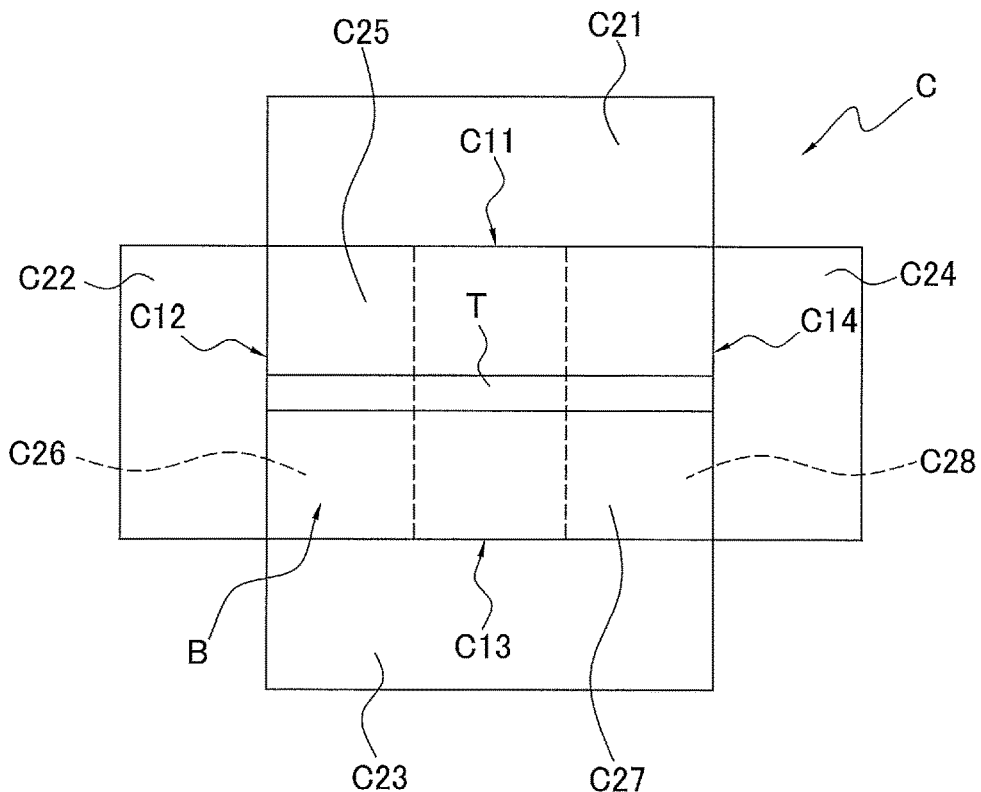
FIG. 2 is a view, seen from a closed bottom cover B side, of a cardboard box C used in the box packing apparatus 10.

An embodiment of the invention will be described with reference to the drawings.

The embodiment described below is a specific example of the invention and is not intended to limit the technical scope of the invention.

(1) Configuration and Operation of Box Packing Apparatus

FIG. 1 is a schematic view of a box packing apparatus 10 that uses a box moving device 20 pertaining to the embodiment of the invention. The box packing apparatus 10 is installed on a line in a food factory, for example, and is an apparatus for packing, into boxes, articles A that have been produced on the line in the food factory. The box packing apparatus 10 feeds, into a cardboard box C that has been placed in a location to which the articles A that are objects to be packed are delivered one after another, pluralities of the articles A through an opening Op of the cardboard box C to thereby pack the articles A. The articles A are bags in which a food such as potato chips has been packaged with a packaging material.

The box packing apparatus 10 is mainly equipped with a box forming unit 1, a box packing unit 2, and a box closing unit 3. FIG. 1 is a schematic front view of the box packing apparatus 10.

In the following description, terms such as upper, lower, left, right, front (front), and rear (back) are used to describe directions and positions. These terms, unless otherwise specified, mean upper, lower, left, right, front, and rear indicated by arrows in the drawings.

(1-1) Box Forming Unit

The box forming unit 1 opens cardboard sheets S, which are the cardboard boxes C in a collapsed state, and closes and seals shut, with tape T, bottom covers B of the cardboard boxes C to thereby form the cardboard boxes C in which just one side thereof is open. FIG. 2 is a view of the cardboard box C seen from the side of the closed bottom cover B. Flaps C21 to C24 on a top cover side opposite the bottom cover B are open outward. The open top cover side of the cardboard box C corresponds to the opening Op of the cardboard box C.

The cardboard boxes C that have been formed by the box forming unit 1 are conveyed by a conveyor (not shown in the drawings) to the box packing unit 2. The box forming unit 1 delivers one after another the cardboard boxes C it has formed to the box packing unit 2.

(1-2) Box Packing Unit

The box packing unit 2 feeds pluralities of the articles A into the cardboard boxes C to thereby pack the articles A.

Figure 3A:
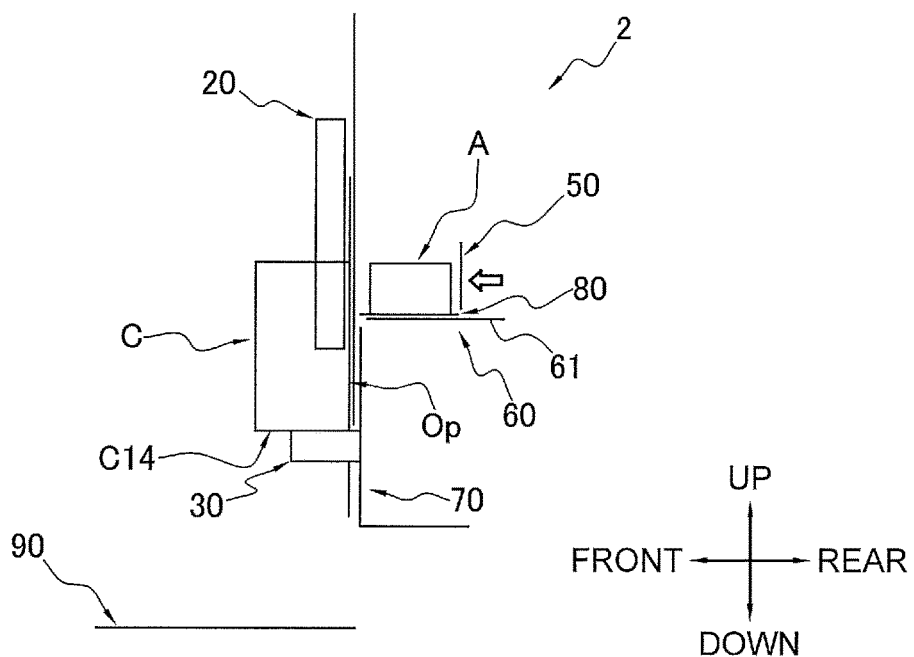
FIG. 3A shows a state just before a first article A is fed into the cardboard box C.
Figure 3B:
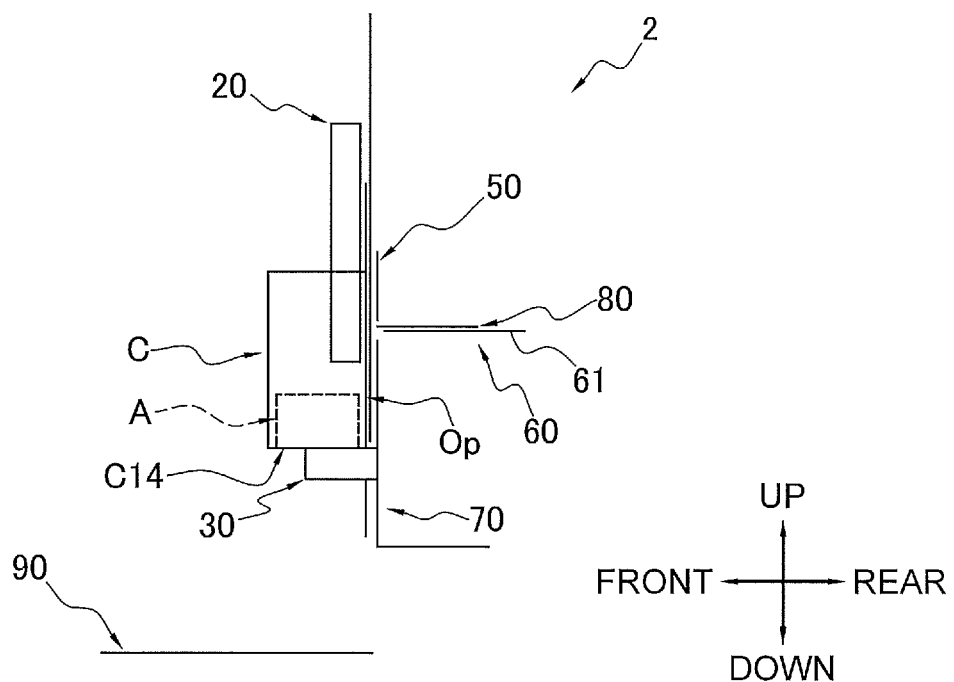
FIG. 3B shows a state just after the first article A has been fed into the cardboard box C.
Figure 3C:
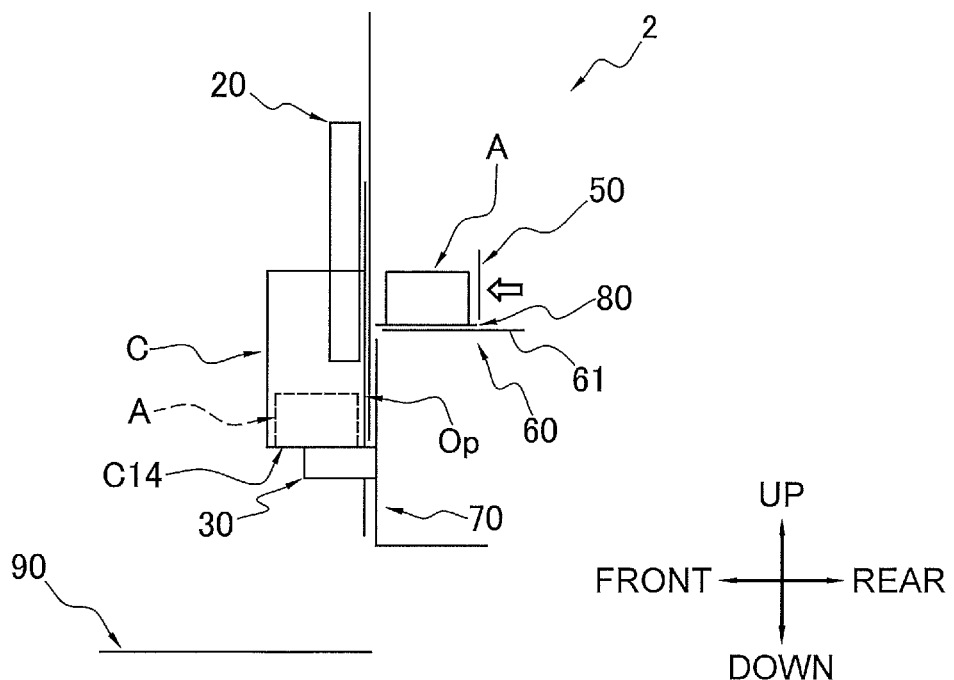
FIG. 3C shows a state just before a second article A is fed into the cardboard box C.
Figure 3F:
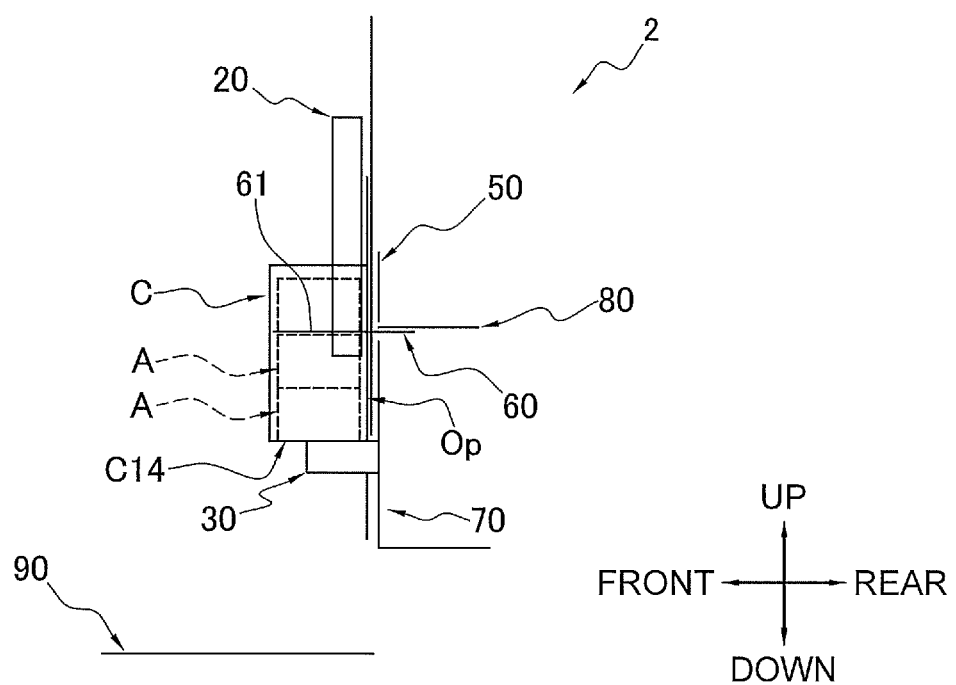
FIG. 3F shows a state just after the third article A has been fed into the cardboard box C.

FIGS. 3A to 3F are drawings for describing the operation of the box packing unit 2. In FIGS. 3A to 3F, three articles A are sequentially fed, starting from the lower side, into a cardboard box C by the box packing unit 2. FIG. 3A shows a state just before the first article A is fed into the cardboard box C. FIG. 3B shows a state just after the first article A has been fed into the cardboard box C. FIG. 3C shows a state just before the second article A is fed into the cardboard box C. FIG. 3D shows a state just after the second article A has been fed into the cardboard box C. FIG. 3E shows a state just before the third article A is fed into the cardboard box C. FIG. 3F shows a state just after the third article A has been fed into the cardboard box C.

The cardboard boxes C that are in a state in which their openings Op face sideways are supplied by the conveyor of the box forming unit 1 to the box packing unit 2. Specifically, the cardboard boxes C having the bottom covers B formed on the front side of the box packing apparatus 10 and the openings Op formed on the back side of the box packing apparatus 10 are supplied to the box packing unit 2.

As shown in FIG. 2, the cardboard box C used in the box packing apparatus 10 has four side surfaces C11 to C14 which are connected to each other in a loop, and eight flat panel-shaped flaps C21 to C28, which extend forward and rearward from the four side surfaces C11 to C14. The flap C21 and the flap C25 extend from the back side and the front side, respectively, of the side surface C11. The flap C22 and the flap C26 extend from the back side and the front side, respectively, of the side surface C12. The flap C23 and the flap C27 extend from the back side and the front side, respectively, of the side surface C13. The flap C24 and the flap C28 extend from the back side and the front side, respectively, of the side surface C14.

At the point in time when the cardboard box C is supplied to the box packing unit 2, the flaps C25 to C28 on the front side of the box packing apparatus 10 have been closed by the box forming unit 1 and sealed shut with the tape T, so that the bottom cover B is formed. Also, at the point in time when the cardboard box C is supplied to the box packing unit 2, the flaps C21 to C24 on the back side of the box packing apparatus 10 are open outward. That is, the cardboard box C is supplied to the box packing unit 2 with its opening Op facing rearward. The cardboard box C is supplied to the box packing unit 2 in a state in which the side surface C14 faces downward as shown in FIG. 2.

The box packing unit 2 mainly has the box moving device 20, a supporting and moving mechanism 30, a feed mechanism 50, a shutter mechanism 60, a spill prevention mechanism 70, an article conveyance mechanism 80, and a box conveyance mechanism 90.

The box moving device 20 moves, to a predetermined position, the cardboard boxes C that are supplied one after another from the box forming unit 1. The box moving device 20 moves the cardboard boxes C from above to below in the vertical direction. The detailed configuration of the box moving device 20 will be described later.

The supporting and moving mechanism 30 supports, at the location where the articles A are packed into the cardboard box C, the cardboard box C that has been moved by the box moving device 20. Furthermore, the supporting and moving mechanism 30 moves the cardboard box C into which the articles C have been packed from the location where the articles A were packed onto a conveyor belt of the box conveyance mechanism 90.

The feed mechanism 50 feeds, into the cardboard box C being supported by the supporting and moving mechanism 30 and through the opening Op of the cardboard box C, the articles A that are conveyed thereto by the article conveyance mechanism 80. The feed mechanism 50 uses a push plate to push the articles A forward to thereby feed the articles A into the cardboard box C.

The shutter mechanism 60 uses a shutter 61 to inhibit the articles A that have already been fed into the cardboard box C from obstructing the feeding of the articles A when the articles A are fed into the cardboard box C. The shutter mechanism 60 uses a pneumatic cylinder or the like to insert the shutter 61 into the cardboard box C and remove the shutter 61 from the cardboard box C.

The spill prevention mechanism 70 prevents the articles A that have already been fed into the cardboard box C from spilling out from the cardboard box C, which is in a state in which its opening Op faces sideways.

The article conveyance mechanism 80 conveys the articles A before the articles A become packed into the cardboard box C. The article conveyance mechanism 80 conveys the articles A with a conveyor belt at a predetermined timing so that the articles A are conveyed in front of the push plate of the feed mechanism 50.

The box conveyance mechanism 90 conveys in the horizontal direction with a conveyor belt, and supplies to the box closing unit 3, the cardboard box C that has been moved by the supporting and moving mechanism 30 and which is in a state in which its opening Op faces upward.

(1-3) Box Closing Unit

The box closing unit 3 closes, and seals shut with tape or the like, the flaps C21 to C24 of the cardboard box C that is supplied from the box conveyance mechanism 90 of the box packing unit 2 and whose opening Op faces upward to thereby form the top cover. The cardboard box C in which the top cover has been formed by the box closing unit 3 is conveyed out from the box packing apparatus 10.

(2) Configuration of Box Moving Device

Figure 5:
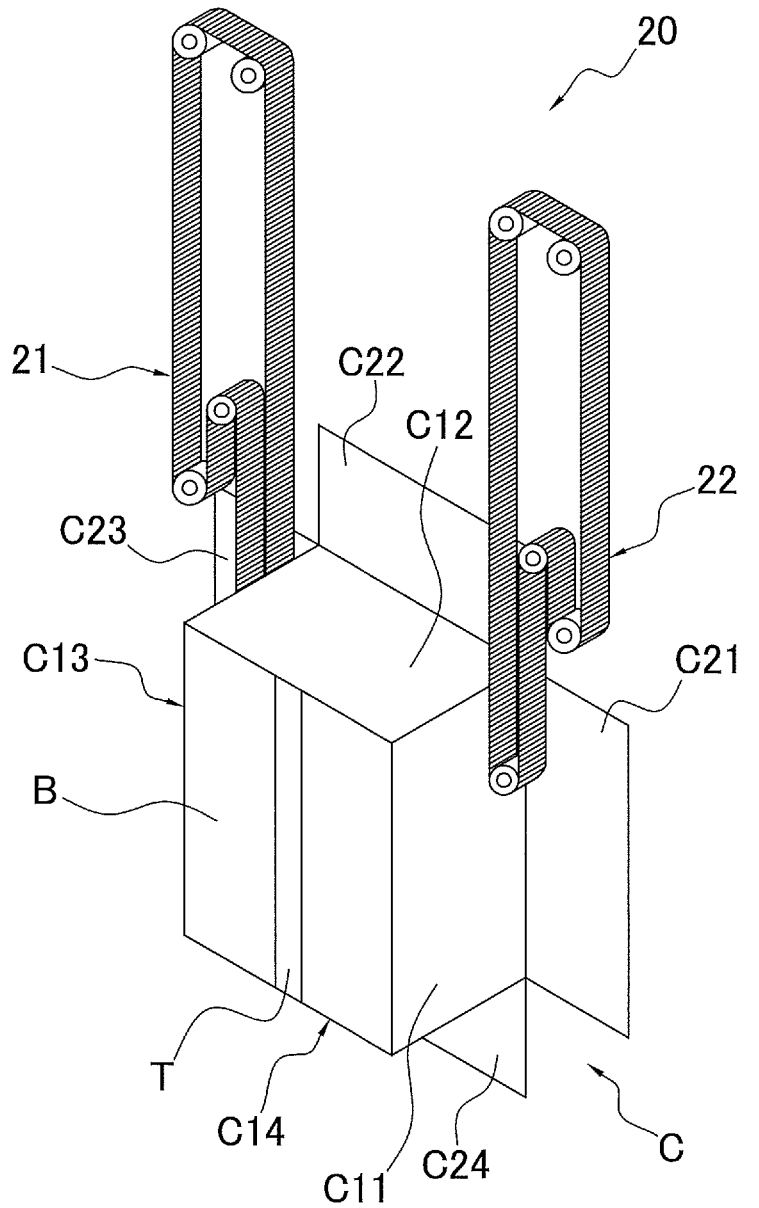
FIG. 5 is a schematic perspective view of the box moving device 20 and shows a state after the conveyors 21, 22 have moved the cardboard box C downward.
Figure 6:
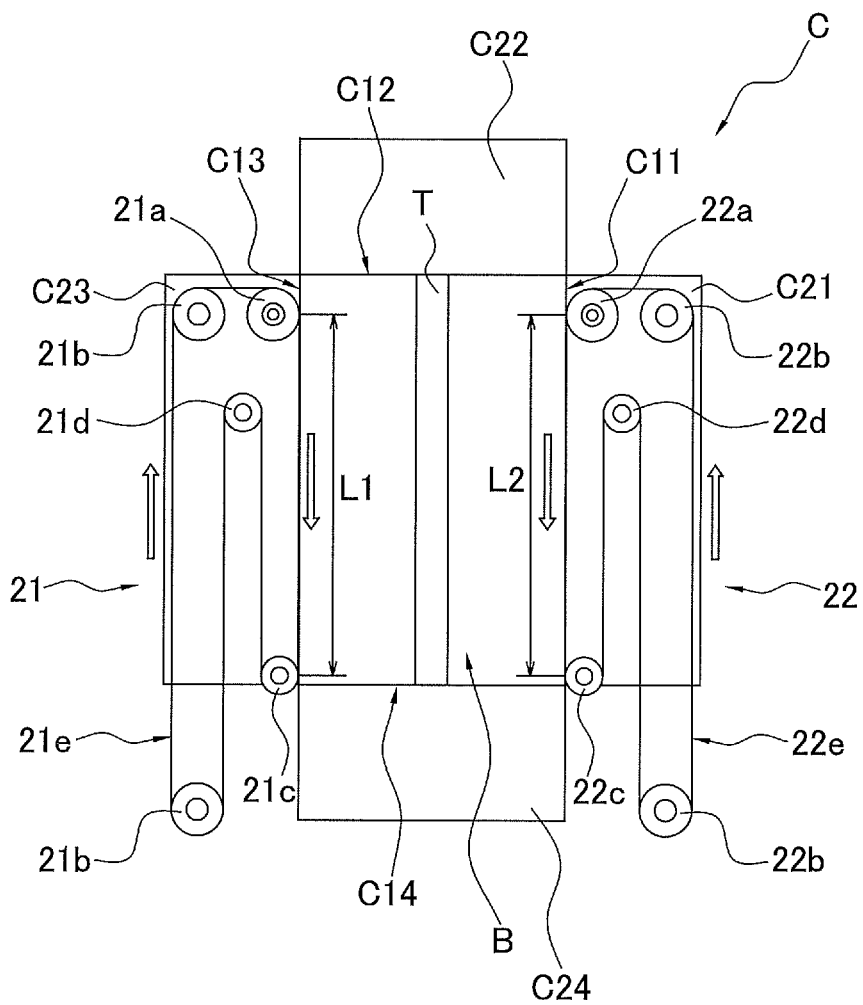
FIG. 6 is a front view of the box moving device 20 shown in FIG. 4.
Figure 6:
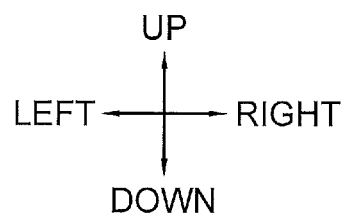
Figure 7:
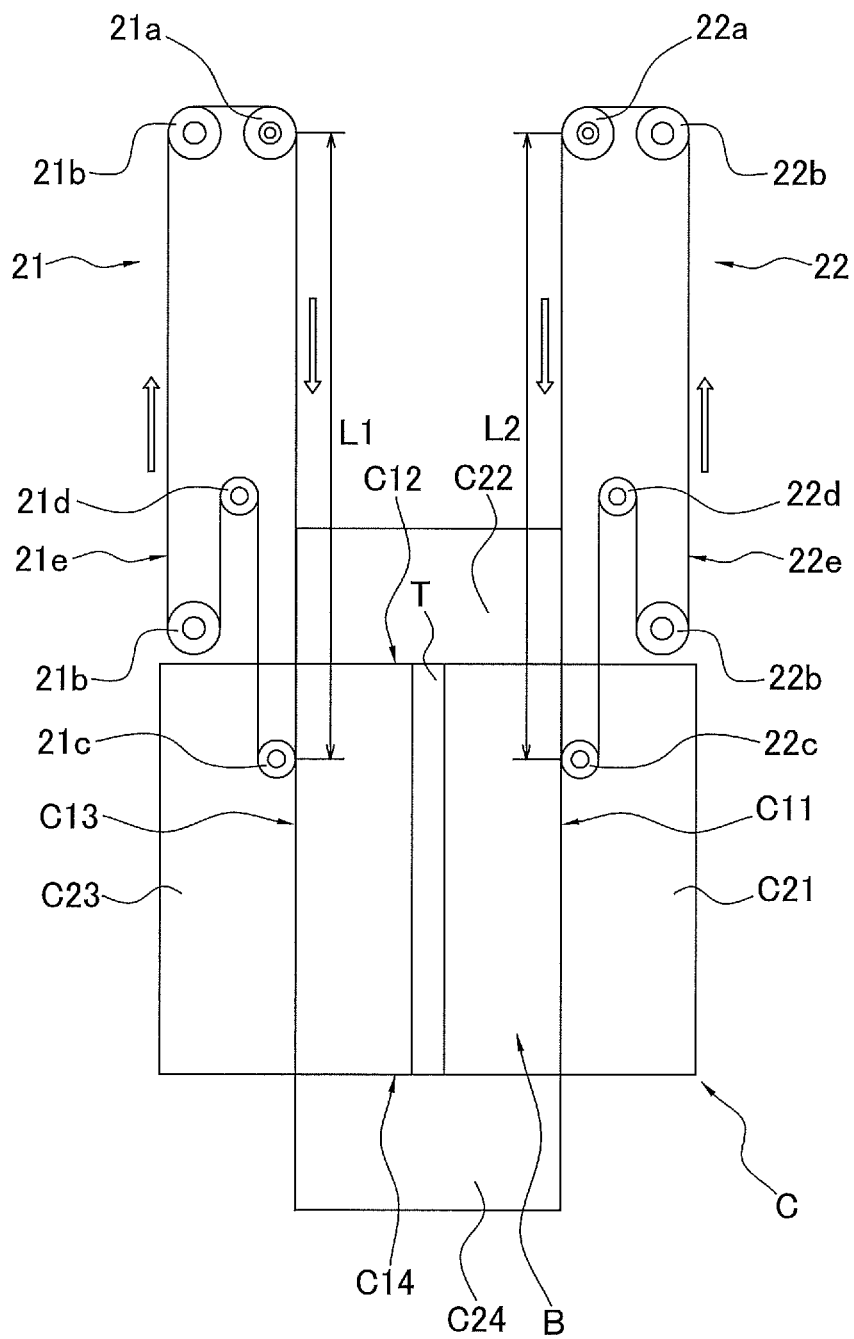
FIG. 7 is a front view of the box moving device 20 shown in FIG. 5.
Figure 7:
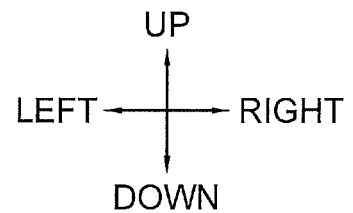

The box moving device 20 of the present embodiment mainly has a pair of conveyors 21, 22 and a movement control unit 23. Below, each of the pair of conveyors 21, 22 is called a first conveyor 21 and a second conveyor 22 as needed. FIG. 4 and FIG. 5 are schematic perspective views of the box moving device 20. FIG. 4 shows a state before the conveyors 21, 22 move a cardboard box C downward. FIG. 5 shows a state after the conveyors 21, 22 have moved the cardboard box C downward. FIG. 6 is a front view of the box moving device 20 shown in FIG. 4. FIG. 7 is a front view of the box moving device 20 shown in FIG. 5. FIG. 8 is a block configuration diagram of the box moving device 20.

(2-1) Conveyors

The conveyors 21, 22 move the cardboard box C from above to below in the vertical direction as a result of being driven while they hold the side surfaces of the cardboard box C. That is, the moving direction of the cardboard box C is parallel to the vertical direction. In FIG. 6 and FIG. 7, the rotational directions of the conveyors 21, 22 are indicated by arrows. The cardboard box C that is moved by the conveyors 21, 22 has the side surface C14 facing downward, the side surface C13 facing leftward, the side surface C12 facing upward, the side surface C11 facing rightward, the bottom cover B facing forward, and the opening Op facing rearward.

The first conveyor 21 is disposed on the left side of the cardboard box C, and the second conveyor 22 is disposed on the right side of the cardboard box C. That is, the first conveyor 21 opposes the side surface C13 of the cardboard box C, and the second conveyor 22 opposes the side surface C11 of the cardboard box C.

The conveyors 21, 22 are a type of belt conveyor called a telescopic conveyor or a shuttle conveyor in which the length of the conveyor can be extended and contracted. The conveyors 21, 22 can extend and contract along the vertical direction.

The first conveyor 21 is a belt conveyor in which a first endless belt 21e is entrained about one first follower roller 21a, two first drive rollers 21b, a first main guide roller 21c, and a first auxiliary guide roller 21d. The first follower roller 21a is positioned on the right side of the two first drive rollers 21b. The first main guide roller 21c is positioned on the right side of the first auxiliary guide roller 21d. The first main guide roller 21c and the first auxiliary guide roller 21d are rollers for changing the length of the first conveyor 21. Between the first follower roller 21a and the first main guide roller 21c, the right-side surface of the first endless belt 21e opposes the side surface C13 of the cardboard box C. When the first conveyor 21 is driven, the first endless belt 21e moves from above to below between the first follower roller 21a and the first main guide roller 21c.

The second conveyor 22 is a belt conveyor in which a second endless belt 22e is entrained about one second follower roller 22a, two second drive rollers 22b, a second main guide roller 22c, and a second auxiliary guide roller 22d. The second follower roller 22a is positioned on the left side of the two second drive rollers 22b. The second main guide roller 22c is positioned on the left side of the second auxiliary guide roller 22d. The second main guide roller 22c and the second auxiliary guide roller 22d are rollers for changing the length of the second conveyor 22. Between the second follower roller 22a and the second main guide roller 22c, the left-side surface of the second endless belt 22e opposes the side surface C11 of the cardboard box C. When the second conveyor 22 is driven, the second endless belt 22e moves from above to below between the second follower roller 22a and the second main guide roller 22c.

The first conveyor 21 has the same length as the second conveyor 22 and is installed in the same position as the second conveyor 22 in the vertical direction. The conveyors 21, 22 each have a holding mode and a non-holding mode. The holding mode is a mode in which the conveyors 21, 22 hold the side surfaces C11, C13 of the cardboard box C. The non-holding mode is a mode in which the conveyors 21, 22 do not hold the side surfaces C11, C13 of the cardboard box C.

When the first conveyor 21 is in the holding mode, the right-side surface of the first endless belt 21e touches the side surface C13 of the cardboard box C between the first follower roller 21a and the first main guide roller 21c. When the first conveyor 21 is driven, the first endless belt 21e moves from above to below between the first follower roller 21a and the first main guide roller 21c. Because of this, a force from above to below in the vertical direction acts on the cardboard box C being held by the first conveyor 21. Conversely, when the first conveyor 21 is in the non-holding mode, the right-side surface of the first endless belt 21e does not touch the side surface C13 of the cardboard box C between the first follower roller 21a and the first main guide roller 21c. For that reason, when the first conveyor 21 is in the non-holding mode, the force does not act on the cardboard box C even if the first conveyor 21 is driven.

When the second conveyor 22 is in the holding mode, the left-side surface of the second endless belt 22e touches the side surface C11 of the cardboard box C between the second follower roller 22a and the second main guide roller 22c. When the second conveyor 22 is driven, the second endless belt 22e moves from above to below between the second follower roller 22a and the second main guide roller 22c. Because of this, a force from above to below in the vertical direction acts on the cardboard box C being held by the second conveyor 22. Conversely, when the second conveyor 22 is in the non-holding mode, the left-side surface of the second endless belt 22e does not touch the side surface C11 of the cardboard box C between the second follower roller 22a and the second main guide roller 22c. For that reason, when the second conveyor 22 is in the non-holding mode, the force does not act on the cardboard box C even if the second conveyor 22 is driven.

In the first conveyor 21, the vertical direction length of the right-side surface of the first endless belt 21e between the first follower roller 21a and the first main guide roller 21c is called a first effective holding length L1. In the second conveyor 22, the vertical direction length of the left-side surface of the second endless belt 22e between the second follower roller 22a and the second main guide roller 22c is called a second effective holding length L2. The first effective holding length L1 and the second effective holding length L2 are the vertical direction dimensions of the sections where the first conveyor 21 and the second conveyor 22 can hold the side surfaces of the cardboard box C.

The first conveyor 21 and the second conveyor 22 shown in FIG. 4 and FIG. 6 are respectively in a state in which the first effective holding length L1 and the second effective holding length L2 are at their shortest. The first conveyor 21 and the second conveyor 22 shown in FIG. 5 and FIG. 7 are respectively in a state in which the first effective holding length L1 and the second effective holding length L2 are at their longest. The range that the first effective holding length L1 and the second effective holding length L2 can take is appropriately set on the basis of, for example, the dimensions of the cardboard box C and the specifications of the box packing apparatus 10.

(2-2) Movement Control Unit

As shown in FIG. 8, the movement control unit 23 is connected to the first conveyor 21 and the second conveyor 22 and controls the first conveyor 21 and the second conveyor 22. The movement control unit 23 is a computer configured from a CPU, a ROM, and a RAM, for example.

The movement control unit 23 has a first conveyor driver 23a, a second conveyor driver 23b, a first effective holding length changer 23c, a second effective holding length changer 23d, a first mode switcher 23e, and a second mode switcher 23f, which are programs stored in the ROM or the like and executed. In other words, these elements are sets of machine-readable instructions, stored on non-transitory memory in the movement control unit 23 that, when executed, cause the movement control unit 23 to perform the functions described.

The first conveyor driver 23a controls the first drive rollers 21b of the first conveyor 21. For example, the first conveyor driver 23a can cause the first drive rollers 21b to rotate at a predetermined rotational speed. Because of this, the first conveyor driver 23a can cause the first endless belt 21e to rotate in the direction shown in FIG. 6 and FIG. 7 to drive the first conveyor 21.

The second conveyor driver 23b controls the second drive rollers 22b of the second conveyor 22. For example, the second conveyor driver 23b can cause the second drive rollers 22b to rotate at a predetermined rotational speed. Because of this, the second conveyor driver 23b can cause the second endless belt 22e to rotate in the direction shown in FIG. 6 and FIG. 7 to drive the second conveyor 22.

The first effective holding length changer 23c controls the first main guide roller 21c and the first auxiliary guide roller 21d of the first conveyor 21. The first effective holding length changer 23c changes the vertical direction positions of the first main guide roller 21c and the first auxiliary guide roller 21d to adjust the first effective holding length L1 of the first conveyor 21. Specifically, the first effective holding length changer 23c changes the first effective holding length L1 by using a pneumatic cylinder or the like to cause the first main guide roller 21c and the first auxiliary guide roller 21d to move the same distance in the same direction.

The second effective holding length changer 23d controls the second main guide roller 22c and the second auxiliary guide roller 22d of the second conveyor 22. The second effective holding length changer 23d changes the vertical direction positions of the second main guide roller 22c and the second auxiliary guide roller 22d to adjust the second effective holding length L2 of the second conveyor 22. Specifically, the second effective holding length changer 23d changes the second effective holding length L2 by using a pneumatic cylinder or the like to cause the second main guide roller 22c and the first auxiliary guide roller 22d to move the same distance in the same direction.

The first mode switcher 23e alternately switches the first conveyor 21 between the holding mode and the non-holding mode. When switching the first conveyor 21 from the holding mode to the non-holding mode, the first mode switcher 23e causes the entire first conveyor 21 to move a predetermined distance leftward. Because of this, the right-side surface of the first endless belt 21e of the first conveyor 21 moves away from, to a position at which it cannot touch, the side surface C13 of the cardboard box C. Conversely, when switching the first conveyor 21 from the non-holding mode to the holding mode, the first mode switcher 23e causes the entire first conveyor 21 to move a predetermined distance rightward. Because of this, the right-side surface of the first endless belt 21e of the first conveyor 21 moves toward, to a position at which it can touch, the side surface C13 of the cardboard box C.

The second mode switcher 23f alternately switches the second conveyor 22 between the holding mode and the non-holding mode. When switching the second conveyor 22 from the holding mode to the non-holding mode, the second mode switcher 23f causes the entire second conveyor 22 to move a predetermined distance rightward. Because of this, the left-side surface of the second endless belt 22e of the second conveyor 22 moves away from, to a position at which it cannot touch, the side surface C11 of the cardboard box C. Conversely, when switching the second conveyor 22 from the non-holding mode to the holding mode, the second mode switcher 23f causes the entire second conveyor 22 to move a predetermined distance leftward. Because of this, the left-side surface of the second endless belt 22e of the second conveyor 22 moves toward, to a position at which it can touch, the side surface C11 of the cardboard box C.

The movement control unit 23 causes the cardboard box C to move to the predetermined position from above to below in the vertical direction, as described next, by executing at predetermined timings the first conveyor driver 23a, the second conveyor driver 23b, the first effective holding length changer 23c, the second effective holding length changer 23d, the first mode switcher 23e, and the second mode switcher 23.

(3) Operation of Box Moving Device

Figure 9:
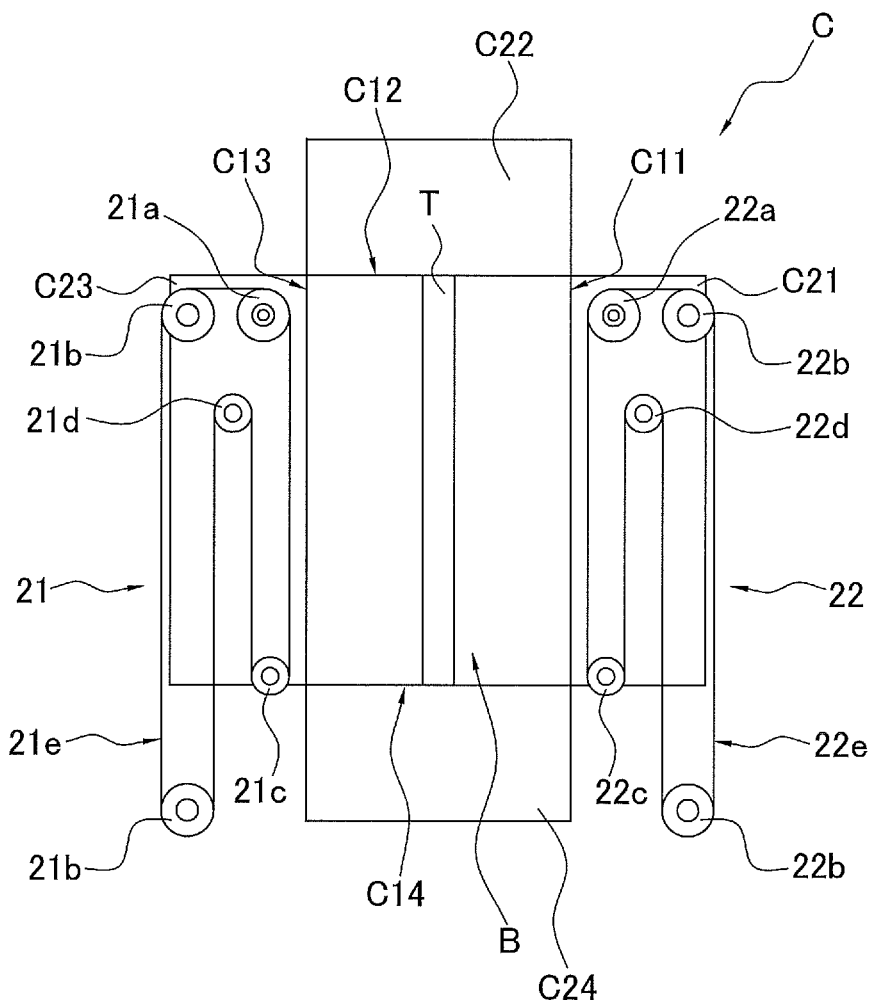
FIG. 9 is a drawing for describing the operation of the box moving device 20 and shows a state at time t1 in FIG. 13.
Figure 9:
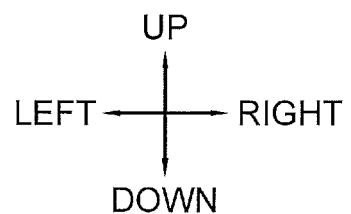
Figure 11:
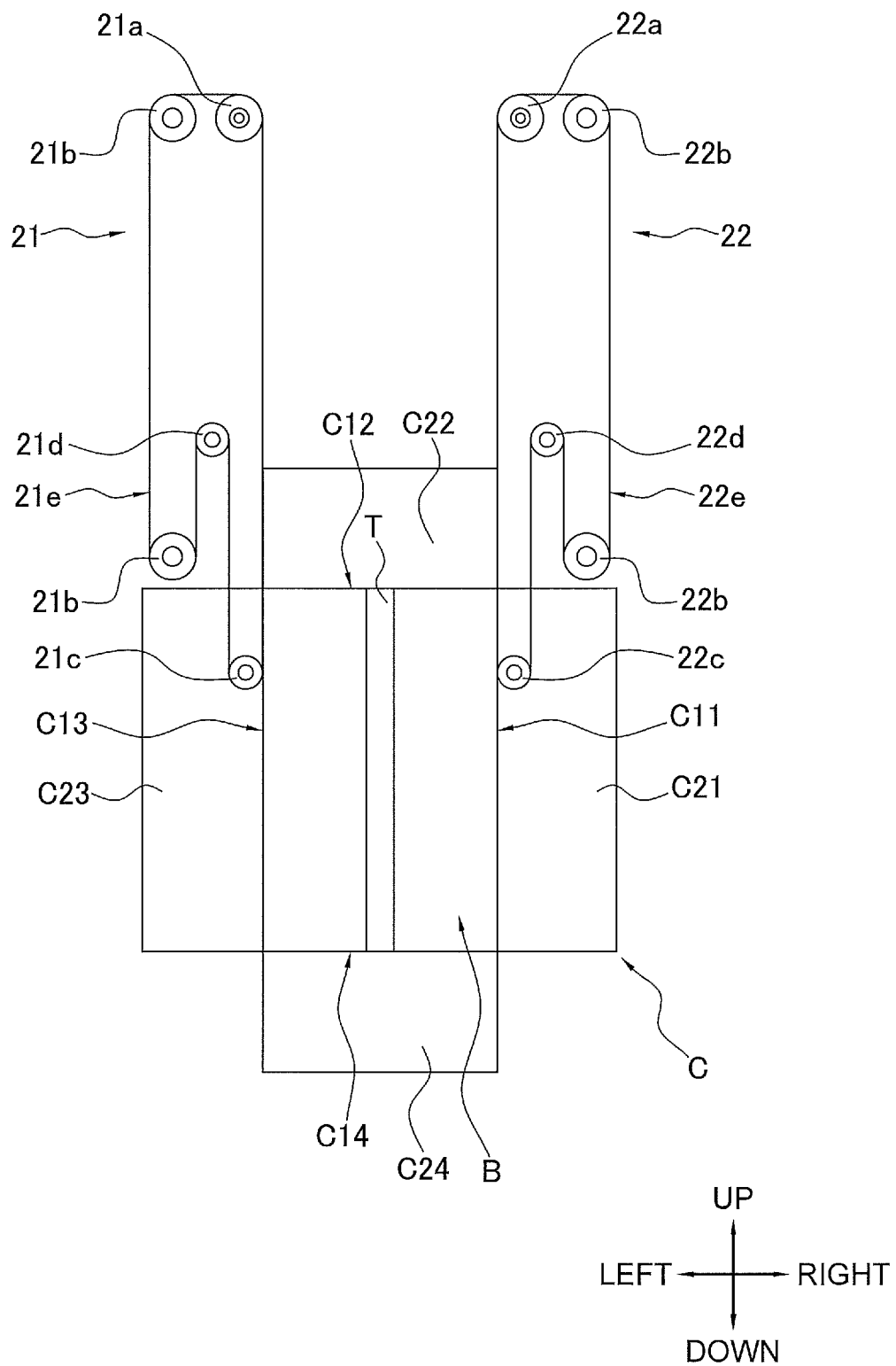
FIG. 11 is a drawing for describing the operation of the box moving device 20 and shows a state at time t3 in FIG. 13.
Figure 12:
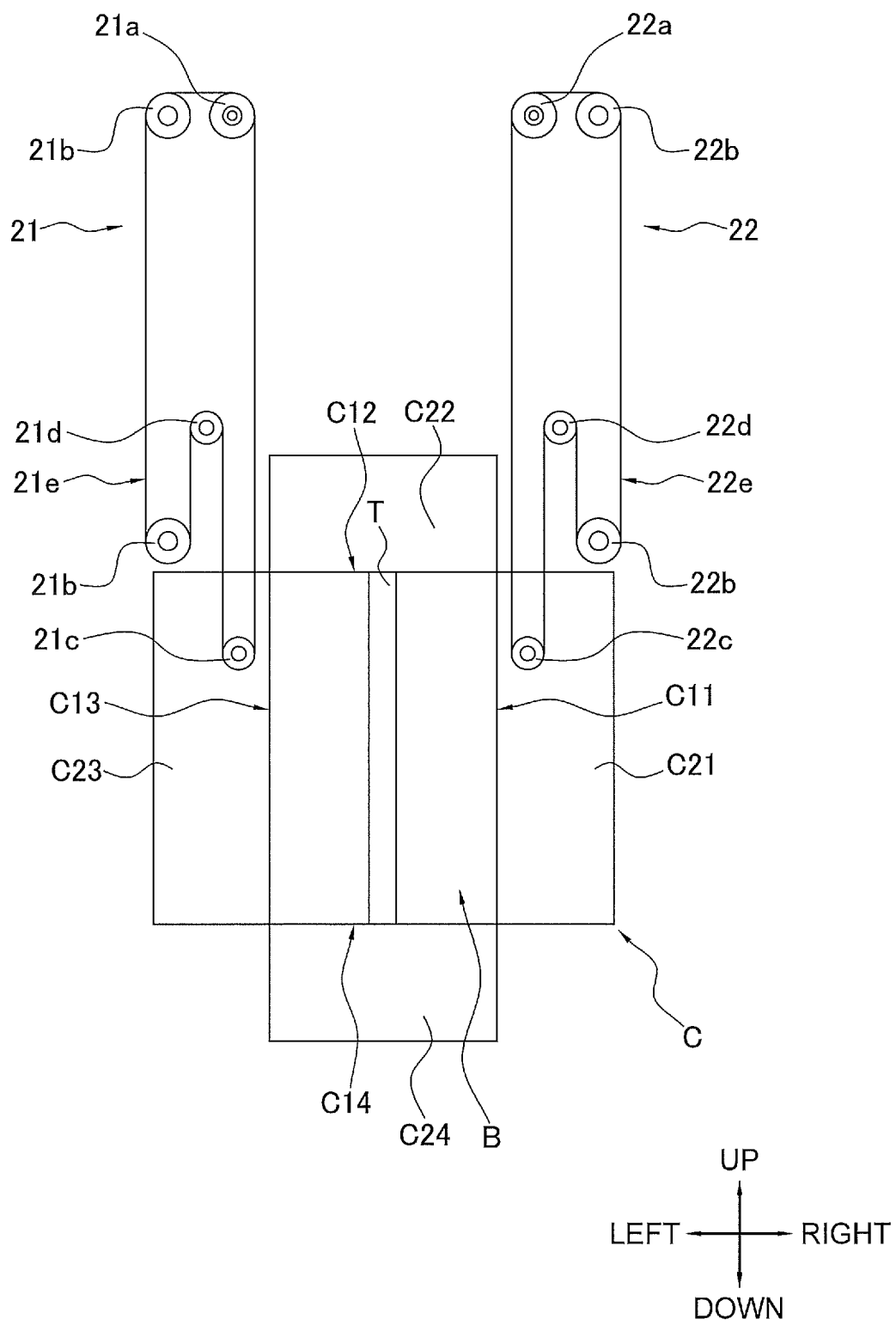
FIG. 12 is a drawing for describing the operation of the box moving device 20 and shows a state at time t4 in FIG. 13.

An operation where the box moving device 20 moves, from above to below in the vertical direction, one cardboard box C that has been supplied from the box forming unit 1 to until the cardboard box C becomes supported by the supporting and moving mechanism 30 will be described using the drawings. FIGS. 9 to 12 are drawings for describing the operation of the box moving device 20. FIGS. 9 to 12 are front views of the box moving device 20. The state of the box moving device 20 changes in the order of FIG. 9, FIG. 10, FIG. 11, and FIG. 12 and then returns to FIG. 9 in the process of moving the cardboard box C. The movement control unit 23 respectively drives, with the first conveyor driver 23a and the second conveyor driver 23b, the first conveyor 21 and the second conveyor 22 while the box packing apparatus 10 is being driven. That is, in the states shown in FIGS. 9 to 12, the first endless belt 21e and the second endless belt 22e are always being driven. In FIG. 9 and FIG. 10, the first effective holding length L1 of the first conveyor 21 and the second effective holding length L2 of the second conveyor 22 are at their shortest as shown in FIG. 6. In FIG. 11 and FIG. 12, the first effective holding length L1 of the first conveyor 21 and the second effective holding length L2 of the second conveyor 22 are at their longest as shown in FIG. 7.

FIG. 9 shows a state just before the cardboard box C that has been supplied from the box forming unit 1 becomes held by the conveyors 21, 22. The cardboard box C is positioned in the neighborhood of the vertical direction upper portions of the conveyors 21, 22. The conveyors 21, 22 are in the non-holding mode. That is, the first endless belt 21e of the first conveyor 21 is not touching the side surface C13 of the cardboard box C, and the second endless belt 22e of the second conveyor 22 is not touching the side surface C11 of the cardboard box C.

In the state shown in FIG. 9, the movement control unit 23 uses the first mode switcher 23e and the second mode switcher 23 to respectively cause the first conveyor 21 and the second conveyor 22 to transition from the non-holding mode to the holding mode. Because of this, the conveyors 21, 22 transition to the state shown in FIG. 10.

FIG. 10 shows a state just after the cardboard box C that has been supplied from the box forming unit 1 has become held by the conveyors 21, 22. The cardboard box C is positioned in the neighborhood of the vertical direction upper portions of the conveyors 21, 22. The conveyors 21, 22 are in the holding mode. That is, the first endless belt 21e of the first conveyor 21 is touching the side surface C13 of the cardboard box C, and the second endless belt 22e of the second conveyor 22 is touching the side surface C11 of the cardboard box C.

In the state shown in FIG. 10, the movement control unit 23 uses the first effective holding length changer 23c and the second effective holding length changer 23d to respectively lengthen the first effective holding length L1 of the first conveyor 21 and the second effective holding length L2 of the second conveyor 22. Because of this, the cardboard box C is conveyed downward in the vertical direction as a result of being held by the conveyors 21, 22 in the holding mode, and at the same time the first conveyor 21 and the second conveyor 22 extend downward in the vertical direction. For that reason, the cardboard box C is conveyed to the neighborhood of the vertical direction lower portions of the conveyors 21, 22 extended in the vertical direction. The cardboard box C that has been conveyed becomes supported by the supporting and moving mechanism 30. Because of this, the conveyors 21, 22 transition to the state shown in FIG. 11.

FIG. 11 shows a state just after the cardboard box C has been conveyed downward in the vertical direction by the conveyors 21, 22 to a position where it becomes supported by the supporting and moving mechanism 30. The cardboard box C is positioned in the neighborhood of the vertical direction lower portions of the conveyors 21, 22. The conveyors 21, 22 are in the holding mode.

In the state shown in FIG. 11, the movement control unit 23 uses the first mode switcher 23e and the second mode switcher 23 to respectively cause the first conveyor 21 and the second conveyor 22 to transition from the holding mode to the non-holding mode. Because of this, the conveyors 21, 22 transition to the state shown in FIG. 12.

FIG. 12 shows a state just after the cardboard box C has been conveyed downward in the vertical direction by the conveyors 21, 22 to the position where it becomes supported by the supporting and moving mechanism 30. The cardboard box C is positioned in the neighborhood of the vertical direction lower portions of the conveyors 21, 22. The conveyors 21, 22 are in the non-holding mode.

In the state shown in FIG. 12, the movement control unit 23 uses the first effective holding length changer 23c and the second effective holding length changer 23d to respectively shorten the first effective holding length L1 of the first conveyor 21 and the second effective holding length L2 of the second conveyor 22. Because of this, the first effective holding length L1 and the second effective holding length L2 shorten to the state shown in FIG. 9. Because of this, the conveyors 21, 22 transition to the state shown in FIG. 9. In the process of transitioning from FIG. 12 to FIG. 9, the conveyors 21, 22 are in the non-holding mode, so the cardboard box C is not conveyed by the conveyors 21, 22.

Figure 13:
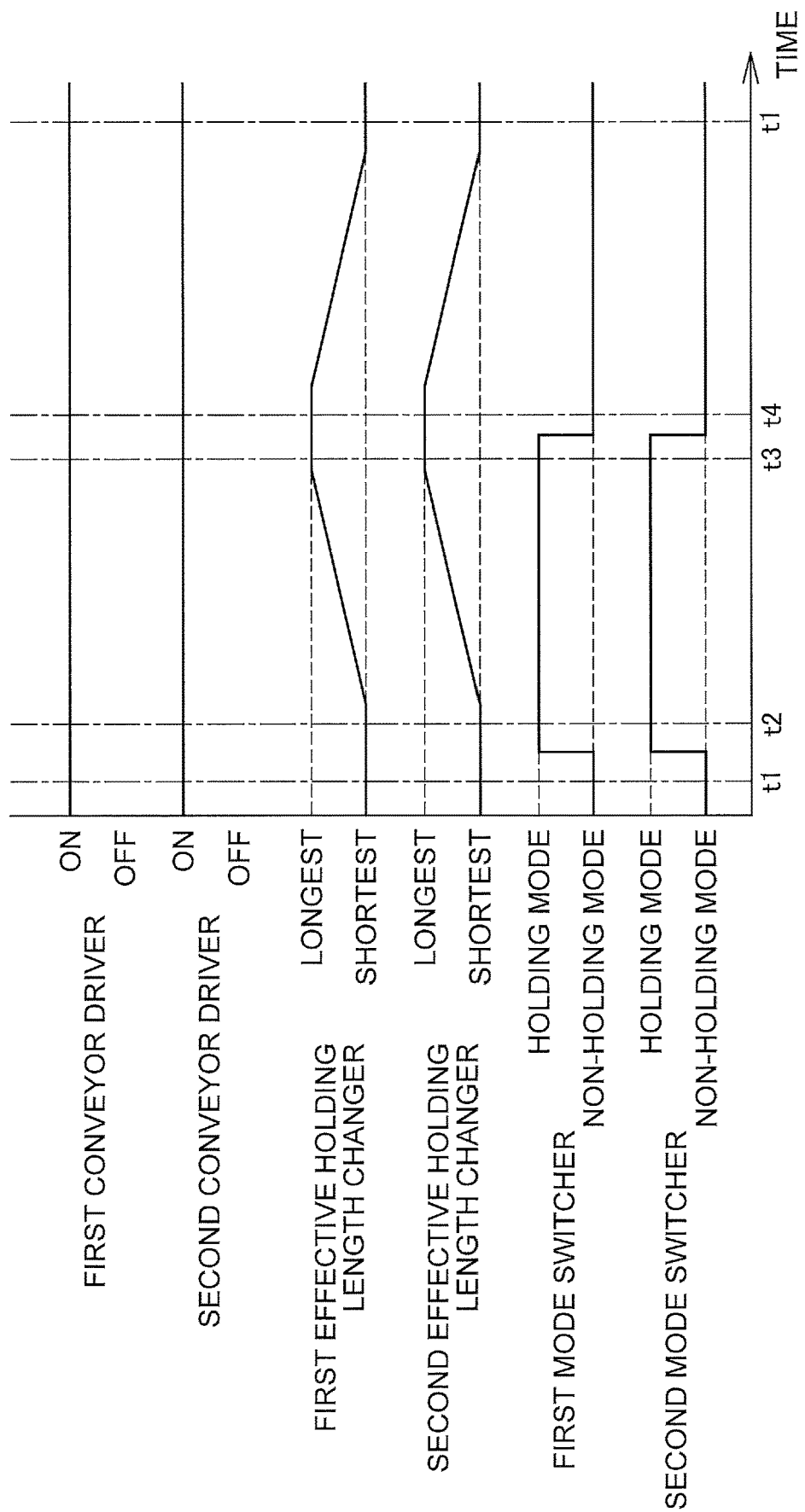
FIG. 13 is a timing chart of control of constituent elements of a movement control unit 23.

FIG. 13 is a timing chart of control of constituent elements of the movement control unit 23. As shown in FIG. 13, the first conveyor driver 23a and the second conveyor driver 23b are synchronously controlled, the first effective holding length changer 23c and the second effective holding length changer 23d are synchronously controlled, and the first mode switcher 23e and the second mode switcher 23 are synchronously controlled. That is, the movement control unit 23 controls the first conveyor 21 and the second conveyor 22 in the same way at the same timings. The states shown in FIGS. 9 to 12 respectively correspond to the states at times t1 to t4 in FIG. 13.

The first conveyor driver 23a and the second conveyor driver 23b can each take an "ON" state, in which they drive the first conveyor 21 and the second conveyor 22, and an "OFF" state, in which they do not drive the first conveyor 21 and the second conveyor 22. In FIG. 13, the first conveyor driver 23a and the second conveyor driver 23b are always in the "ON" state. That is, the first endless belt 21e of the first conveyor 21 and the second endless belt 22e of the second conveyor 22 are always being driven.

The first effective holding length changer 23c and the second effective holding length changer 23d can each take an arbitrary state between a "shortest" state, in which the first effective holding length L1 and the second effective holding length L2 are at their shortest, and a "longest" state, in which the first effective holding length L1 and the second effective holding length L2 are at their longest. The range that the first effective holding length L1 and the second effective holding length L2, which is the range from the shortest to the longest, can take is appropriately set on the basis of, for example, the dimensions of the cardboard boxes C and the specifications of the box packing apparatus 10. In FIG. 13, the first effective holding length changer 23c and the second effective holding length changer 23d transition between "shortest" and "longest."

The first mode switcher 23e and the second mode switcher 23 can each take the "holding mode" and the "non-holding mode" of the first conveyor 21 and the second conveyor 22. In FIG. 13, the first mode switcher 23e and the second mode switcher 23 transition between the "holding mode" and the "non-holding mode."

(4) Characteristics (4-1)

The box packing apparatus 10 is a device for changing the vertical direction position of the cardboard box C having the four side surfaces C11 to C14 that are connected to each other in a loop. The box packing apparatus 10 is equipped with the conveyors 21, 22 for conveying the cardboard box C downward in the vertical direction and the movement control unit 23 for controlling the operation of the conveyors 21, 22. The movement control unit 23 causes the cardboard box C to move from above to below in the vertical direction by driving the conveyors 21, 22 that are in the holding mode and simultaneously switching the conveyors 21, 22 from a state in which are contracted along the vertical direction (FIG. 10) to a state in which they are extended along the vertical direction (FIG. 11). The movement control unit 23 can alternately switch the conveyors 21, 22 between the state in which they are contracted and the state in which they are extended.

The box moving device 20 moves the cardboard box C to the predetermined position by extending the conveyors 21, 22 in the direction in which they move the cardboard box C (downward in the vertical direction) in a state in which the side surfaces C13, C11 of the cardboard box C are being respectively held by the conveyors 21, 22. As shown in FIG. 6 and FIG. 7, the movement control unit 23 can extend and contract the conveyors 21, 22 in the vertical direction by adjusting the first effective holding length L1 of the first conveyor 21 and the second effective holding length L2 of the second conveyor 22.

In this way, by using the conveyors 21, 22 that can extend and contract in the moving direction of the cardboard box C while they hold the cardboard box C, the box moving device 20 can move, with the conveyors 21, 22, the cardboard box C to the predetermined position in a state in which the cardboard box C is held by the conveyors 21, 22. Because of this, the box moving device 20 can inhibit the problem that the cardboard box C is not conveyed normally to the predetermined position. For that reason, the occurrence of the problem that the moving of the cardboard box C stops midway before the cardboard box C reaches the position where it becomes supported by the moving and supporting mechanism 30, so that as a result the articles A are not fed normally into the cardboard box C, is inhibited.

Consequently, the box moving device 20 inhibits the occurrence of the problem that the cardboard box C does not reach the predetermined position, so an improvement in the reliability of the box moving device 20 can be expected.

(4-2)

In the box moving device 20, the movement control unit 23 lengthens the first effective holding length L1 and the second effective holding length L2 to extend the conveyors 21, 22 in the vertical direction by causing the first main guide roller 21c and the second main guide roller 22c to move downward in the vertical direction. Conversely, the movement control unit 23 shortens the first effective holding length L1 and the second effective holding length L2 to contract the conveyors 21, 22 in the vertical direction by causing the first main guide roller 21c and the second main guide roller 22c to move upward in the vertical direction. The first main guide roller 21c and the second main guide roller 22c correspond to end portions of the conveyors 21, 22 on the side of the moving destination of the cardboard box C (the lower side).

In this way, the box moving device 20 can cause the conveyors 21, 22 to extend and contract downward in the vertical direction, which is the moving destination of the cardboard box C. Because of this, the box moving device 20 does not need to use conveyors with long lengths that extend as far as the neighborhood of the predetermined position to convey the cardboard box C to the predetermined position. For that reason, the dimension of the conveyors 21, 22 (the length of the conveyors 21, 22) in the vertical direction, which is the moving direction of the cardboard box C, is kept down and a large-scale mechanism that moves the conveyors 21, 22 themselves along the moving direction of the cardboard box C becomes unnecessary.

Consequently, with the box moving device 20, space for installing a device other than the conveyors 21, 22 can be ensured in the neighborhood of the cardboard box C that has been conveyed by the conveyors 21, 22. For that reason, for example, space for installing the feed mechanism 50 and the shutter mechanism 60, which are used for packing the articles A into the cardboard boxes C, can be sufficiently ensured under the conveyors 21, 22.

(4-3)

In the box moving device 20, the conveyors 21, 22 each have the non-holding mode in which they do not hold the side surfaces C13, C11 of the cardboard box C. The movement control unit 23 drives the conveyors 21, 22 and simultaneously causes the conveyors 21, 22 to extend downward in the vertical direction to move the cardboard box C, then changes the conveyors 21, 22 from the holding mode to the non-holding mode, and then causes the conveyors 21, 22 to contract in the vertical direction.

Because of this, the box moving device 20 can move, with the conveyors 21, 22, the cardboard box C to the predetermined position and then, in a state in which the side surfaces C13, C11 of the cardboard box C are not being respectively held by the conveyors 21, 22, return the first effective holding length L and the second effective holding length L2 to the state before the cardboard box C was moved (FIG. 9).

Consequently, the box moving device 20 can prevent the problem that the cardboard box C ends up being held and moved by the conveyors 21, 22 when the conveyors 21, 22 become contracted after they have moved the cardboard box C.

Furthermore, just after the box moving device 20 conveys the cardboard box C to the predetermined position and changes the conveyors 21, 22 from the holding mode to the non-holding mode (FIG. 12), the next cardboard box C that has been supplied from the box forming unit 1 can be set between the conveyors 21, 22 as shown in FIG. 9. Because of this, just after the cardboard box C has been conveyed by the supporting and moving mechanism 30 to the box conveyance mechanism 90, the box moving device 20 can prepare to hold, with the conveyors 21, 22, the next cardboard box C. Consequently, the box moving device 20 can efficiently convey the cardboard boxes C and can improve the capacity of the box packing apparatus 10.

(4-4)

The box moving device 20 can move the cardboard box C from above to below along the vertical direction in a state in which the side surface C14, which is one of the four side surfaces C11 to C14 of the cardboard box C, faces downward. Because of this, the box moving device 20 can move the cardboard box C to the predetermined position in a state in which the opening Op of the cardboard box C faces sideways (rearward).

Consequently, the box moving device 10 can be utilized in the box packing apparatus 10 for packing the articles A in the horizontal direction into the cardboard boxes C that have been conveyed by the conveyors 21, 22.

(4-5)

In the box moving device 20, telescopic conveyors whose holding surfaces that hold the side surfaces C13, C11 of the cardboard box C can extend and contract in the moving direction of the cardboard box C are used as the conveyors 21, 22. The holding surfaces are the right-side surface of the first endless belt 21e of the first conveyor 21, which touches the side surface C13 of the cardboard box C, and the left-side surface of the second endless belt 22e of the second conveyor 22, which touches the side surface C11 of the cardboard box C.

Because of this, the box moving device 20 can cause the conveyors 21, 22 to extend and contract downward in the vertical direction, which is the moving destination of the cardboard box C. For that reason, the dimension of the conveyors 21, 22 (the length of the conveyors 21, 22) in the vertical direction, which is the moving direction of the cardboard box C, is kept down and a large-scale mechanism that moves the conveyors 21, 22 themselves along the moving direction of the cardboard box C becomes unnecessary. Consequently, with the box moving device 20, space for installing a device other than the conveyors 21, 22 can be ensured in the neighborhood of the cardboard box C that has been conveyed by the conveyors 21, 22.

Furthermore, the box moving device 10 can stably move the cardboard box C to the predetermined position by moving the cardboard box C while holding, with the conveyors 21, 22, the side surfaces C13, C11 on both sides of the cardboard box C.

(4-6)

The speed at which the cardboard box C is moved by the box moving device 20 is equal to the speed of the first endless belt 21e of the first conveyor 21 and the second endless belt 22e of the second conveyor 22. Furthermore, the speed at which the cardboard box C is moved by the box moving device 20 is independent of the extension/contraction speed (the speed at which the first effective holding length L1 and the second effective holding length L2 change) and the extension/contraction timing (the timing when the first effective holding length L1 and the second effective holding length L2 change) of the first conveyor 21 and the second conveyor 22. For that reason, it is not necessary to strictly synchronize the extension/contraction speed and the extension/contraction timing of the first conveyor 21 and the second conveyor 22. Consequently, inexpensive mechanisms such as pneumatic cylinders can be employed as the drive source for changing the positions of the first main guide roller 21c and the first auxiliary guide roller 21d of the first conveyor 21 and the drive source for changing the positions of the second main guide roller 22c and the second auxiliary guide roller 22d of the second conveyor 22.

(5) Example Modifications

An embodiment of the invention has been described above, but the invention is not limited to the above embodiment and can be changed in various ways in a range that does not depart from the spirit thereof.

(5-1) Example Modification A

It is preferred that the box moving device 20 of the embodiment be further equipped with a flap guide 30. While the box moving device 20 is moving the cardboard box C downward in the vertical direction, the flaps C21 to C24 of the cardboard box C, which are located on the back side of box packing apparatus 10, are open outward. The flap guide 30 guides the flaps C21 to C24 of the cardboard box C to regulate the front and rear direction and right and left direction position of the cardboard box C while the box moving device 20 is moving the cardboard box C downward in the vertical direction.

Figure 14:
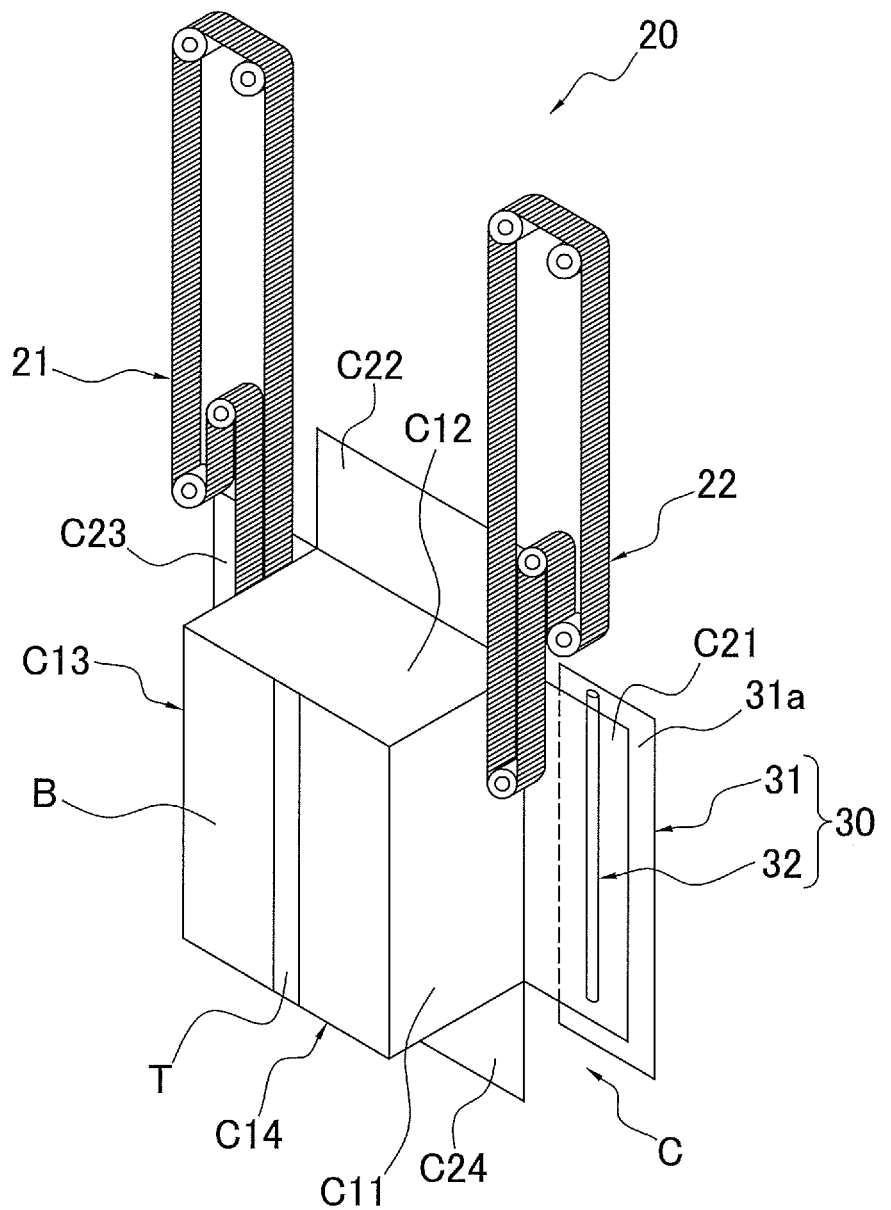
FIG. 14 is a schematic perspective view of the box moving device 20 equipped with a pair of flap guides 30 in example modification A.
Figure 14:
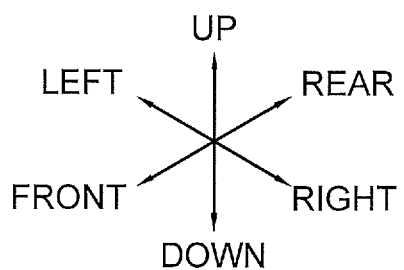

The flap guide 30 has a structure that can guide, along the vertical direction, at least one of the flaps C21 to C24 of the cardboard box C. FIG. 14 shows an example of the flap guide 30 of the present example modification. FIG. 14 is a schematic perspective view of the box moving device 20 equipped with the flap guide 30. The flap guide 30 guides the flap C21 on the right side of the cardboard box C.

The flap guide 30 is installed on the vertical direction lower side of the right-side conveyor 22. The flap guide 30 is mainly configured from a fixed guide portion 31 and a movable guide portion 32. The fixed guide portion 31 is installed on the rear side of the flap C21 of the cardboard box C that moves downward in the vertical direction. The fixed guide portion 31 is fixed in a predetermined position. The fixed guide portion 31 has a fixed guide surface 31a that is orthogonal to the front and rear direction. The fixed guide surface 31a touches the rear-side surface of the flap C21 being guided by the flap guide 30.

The movable guide portion 32 is installed on the vertical direction lower side of the right-side conveyor 22 so as to be movable in the front and rear direction and the right and left direction by a drive mechanism (not shown in the drawings). The movable guide portion 32 can, together with the fixed guide portion 31, sandwich, on the front side of the fixed guide portion 31, the flap C21 of the cardboard box C that moves downward in the vertical direction. The movable guide portion 32 can have an arbitrary shape that can, together with the fixed guide portion 31, sandwich the flap C21.

In FIG. 14, the flap C21 of the cardboard box C moving downward in the vertical direction is sandwiched between the fixed guide portion 31 and the movable guide portion 32, whereby movement of the flap C21 in the front and rear direction and the right and left direction is regulated. Because of this, movement, in the front and rear direction and the right and left direction, of the cardboard box C21 moving downward in the vertical direction is regulated by the flap guide 30.

In this way, the flap guide 30 regulates the front and rear direction and right and left direction position of the moving cardboard box C by guiding the flap C21 of the cardboard box C while the cardboard box C is being moved downward in the vertical direction by the movement control unit 23. Consequently, the box moving device 20 can prevent, with the flap guide 30, positional misalignment of the cardboard box C that has been conveyed by the conveyors 21, 22 and can move the cardboard box C in a predetermined posture to the predetermined position. As a result, when the articles A are packed into the cardboard box C by the feed mechanism 50, the problem that the articles A collide with the cardboard box C because of positional misalignment of the cardboard box C, so that the cardboard box C moves in the horizontal direction, is inhibited.

Furthermore, in FIG. 14, the flap guide 30 guides the flap C21 on the right side of the cardboard box C. However, the flap guide 30 may also guide the flap C23 on the left side of the cardboard box C, or may also guide both the flaps C21, C23 on both the right and left sides of the cardboard box C.

Furthermore, as mentioned above, with the box moving device 20 of the embodiment, space for installing a device other than the conveyors 21, 22 can be ensured in the neighborhood of the cardboard box C that has been conveyed by the conveyors 21, 22. For that reason, in the present example modification, space for installing the flap guide 30 can be sufficiently ensured under the conveyors 21, 22.

Furthermore, the flap guide 30 may also have another structure that can guide at least one of the flaps C21 to C24 of the cardboard box C while the cardboard box C is being moved downward in the vertical direction by the movement control unit 23. That is, the flap guide 30 can have an arbitrary structure for regulating the front and rear direction and right and left direction position of the cardboard box C moving downward in the vertical direction.

(5-2) Example Modification B

The box moving device 20 of the embodiment moves the cardboard box C to the predetermined position by extending the conveyors 21, 22 in the direction in which they move the cardboard box C (downward in the vertical direction) in a state in which the side surfaces C13, C11 of the cardboard box C are being respectively held by the conveyors 21, 22. In this way, the box moving device 20 moves the cardboard box C by respectively holding, with the conveyors 21, 22, the two side surfaces C13, C11 of the four side surfaces C11 to C13 of the cardboard box C.

However, the box moving device 20 may also move the cardboard box C to the predetermined position in a state in which at least one of the four side surfaces C11 to C13 of the cardboard box C is held. For example, the box moving device 20 may also move the cardboard box C by holding, with the conveyor 21, just the side surface C13 on the left side of the cardboard box C. Furthermore, the box moving device 20 may also move the cardboard box C by holding, with the conveyor 22, just the side surface C11 on the right side of the cardboard box C. In these cases, it is preferred that the side surface not held by the conveyors 21, 22 out of the side surfaces C13, C11 on both the right and left sides of the cardboard box C be guided by an arbitrary guide member while the cardboard box C is moving downward.

Figure 15:
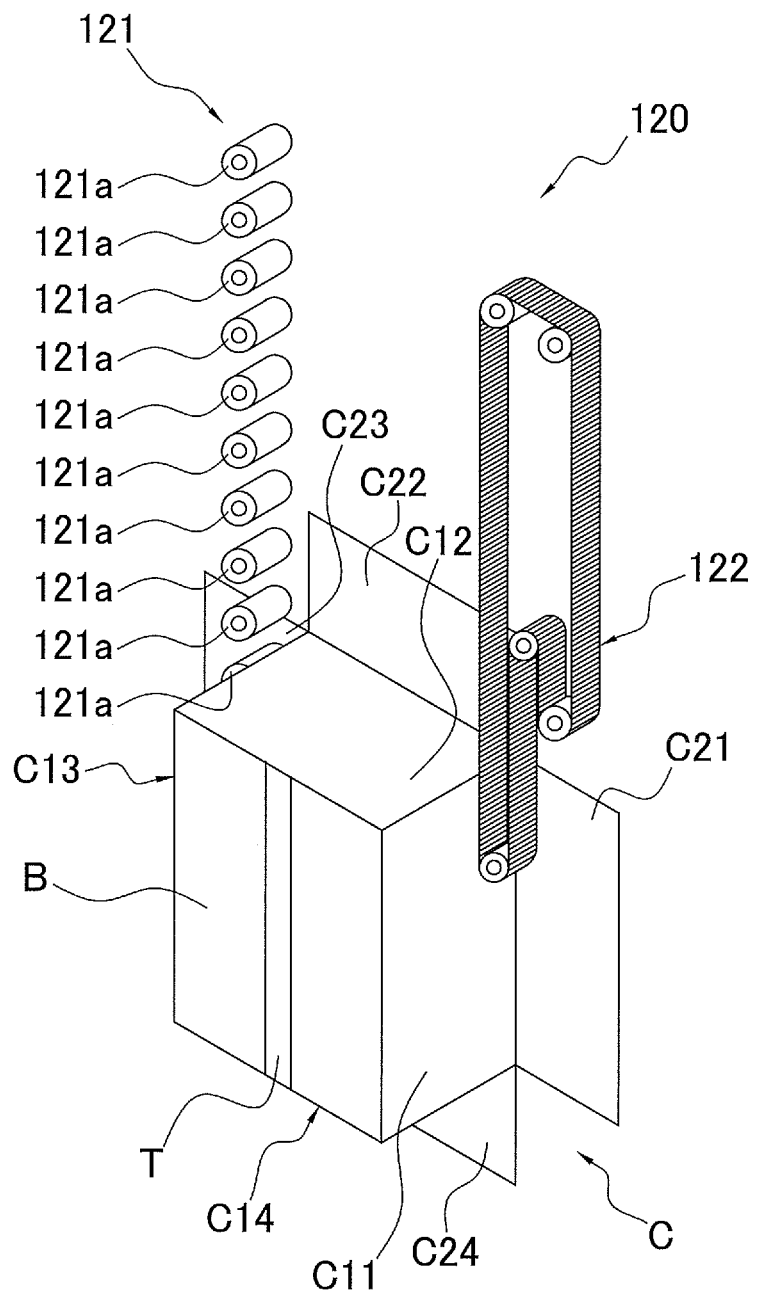
FIG. 15 is a schematic perspective view of a box moving device 120 in example modification B.
Figure 15:
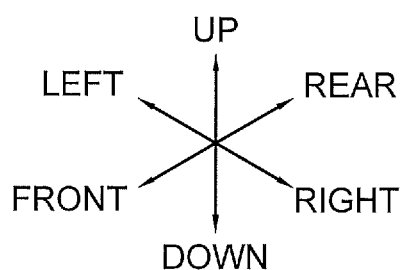

FIG. 15 is a schematic perspective view of a box moving device 120 in the present example modification. In FIG. 15, a conveyor 122 is installed on the right side of the cardboard box C and a conveyance roller 121 is installed on the left side of the cardboard box C. The conveyor 122 has the same structure and function as the conveyor 22 of the embodiment. That is, the conveyor 122 has a holding mode and a non-holding mode.

The conveyance roller 121 is fixed in a predetermined position. The conveyance roller 121 has plural rollers 121a disposed along the vertical direction. The rollers 121a are rollers with open cylinder shapes, for example. The rollers 121a are disposed in such a way that the rotational axes of the open cylinder shapes are along the front and rear direction. That is, the rollers 121a are rotatable along the vertical direction.

When the conveyor 122 is in the holding mode, the surface C13 on the left side of the cardboard box C touches the rollers 121a of the conveyance roller 121. While the cardboard box C is being moved downward in the vertical direction by the conveyor 122, the rollers 121a of the conveyance roller 121 rotate while touching the side surface C13 on the left side of the cardboard box C. In this way, the conveyance roller 121 guides the cardboard box C conveyed by the conveyor 122, regulates the right and left direction position of the cardboard box C, and prevents positional misalignment of the cardboard box C.

It will be noted that, in FIG. 15 a conveyor having the same structure and function as the conveyor 21 of the embodiment may also be installed on the left side of the cardboard box C, and a conveyance roller having the same structure and function as the conveyance roller 121 of the present example modification may also be installed on the right side of the cardboard box C.

(5-3) Example Modification C

The box moving device 20 of the embodiment moves the cardboard box C from above to below along the vertical direction in a state in which the side surface C14, which is one of the four side surfaces C11 to C14 of the cardboard box C, faces downward and the opening Op faces sideways (rearward). However, the orientation of the cardboard box C conveyed by the box moving device 20 and the moving direction of the cardboard box C can be appropriately changed depending on the apparatus in which the box moving device 20 is used.

For example, the box moving device 20 can also be applied to an apparatus that moves the cardboard box C along the horizontal direction in a state in which the bottom cover B of the cardboard box C faces downward and the opening Op faces upward. In this case, the positions and orientation of the conveyors 21, 22 are appropriately changed in the box moving device 20.

REFERENCE SIGNS LIST

20 Box Moving Device
21 First Conveyor (Conveyor)
21c First Main Guide Roller (End Portion of Conveyor)
22 Second Conveyor (Conveyor)
22c Second Main Guide Roller (End Portion of Conveyor)
23 Movement Control Unit
30 Flap Guide
C Cardboard Box (Box)
C11 to C14 Side Surfaces
C21 to C24 Flaps

The invention claimed is:

1. A box moving device for changing the position of a box having four side surfaces that are connected to each other in a loop, the box moving device comprising:
    a conveyor that has at least a holding mode in which it holds at least one of the side surfaces of the box and a non-holding mode in which it does not hold the side surface; and
    a movement control unit that drives the conveyor to cause the box to move along a moving direction from a first position to a second position, the movement control unit changes the conveyor from the holding mode to the non-holding mode by moving the conveyor away from the side surfaces,
    wherein the conveyor can alternately switch between a first state, in which it is contracted along the moving direction, and a second state, in which it is extended along the moving direction, and
    the movement control unit causes the box to move from the first position to the second position by driving the conveyor that is in the holding mode and simultaneously switching the conveyor from the first state to the second state.

2. The box moving device according to claim 1, wherein the movement control unit
    switches the conveyor from the first state to the second state by causing an end portion of the conveyor to move from the first position to the second position and
    switches the conveyor from the second state to the first state by causing the end portion of the conveyor to move from the second position to the first position.

3. The box moving device according to claim 1, wherein the movement control unit causes the box to move from the first position to the second position, then changes the conveyor from the holding mode to the non-holding mode, and then switches the conveyor from the second state to the first state.

4. The box moving device according to claim 1, wherein the movement control unit causes the box to move from the first position to the second position by causing the box to move from above to below along the vertical direction in a state in which one of the four side surfaces of the box faces downward.

5. The box moving device according to claim 4, further comprising a flap guide, wherein
    the box further has a flap that is a flat panel-shaped cover portion that extends from the side surface, and
    the flap guide guides the flap while the movement control unit is causing the box to move from the first position to the second position.

6. The box moving device according to claim 4, wherein in the holding mode the conveyor holds the two side surfaces that are along the moving direction.

7. The box moving device according to claim 1, wherein the conveyor is a telescopic conveyor whose holding surface that holds the side surface can extend and contract in the moving direction.

8. The box moving device according to claim 7, wherein the conveyor further comprises:
    first and second drive pulleys;
    movable first and second guide pulleys; and
    an endless belt trained around the first and second drive pulleys and the first and second guide pulleys such that it is driven by the first and second drive pulleys;
    wherein the movement control unit causes the holding surface that holds the side surface to extend and contract in the moving direction by causing the first and second guide pulleys to move.

* * * * *